(12) United States Patent
Maeda et al.

(10) Patent No.: US 9,925,636 B2
(45) Date of Patent: Mar. 27, 2018

(54) POLISHING DEVICE AND POLISHING METHOD

(71) Applicant: SINTOKOGIO, LTD., Nagoya-shi, Aichi (JP)

(72) Inventors: Kazuyoshi Maeda, Aichi (JP); Norihito Shibuya, Aichi (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 114 days.

(21) Appl. No.: 14/909,992

(22) PCT Filed: Mar. 26, 2014

(86) PCT No.: PCT/JP2014/058508
§ 371 (c)(1),
(2) Date: Feb. 4, 2016

(87) PCT Pub. No.: WO2015/019661
PCT Pub. Date: Feb. 12, 2015

(65) Prior Publication Data
US 2016/0176008 A1    Jun. 23, 2016

(30) Foreign Application Priority Data

Aug. 9, 2013  (JP) .................................. 2013-165742
Dec. 28, 2013 (JP) .................................. 2013-273642

(51) Int. Cl.
*B24B 31/12* (2006.01)
*B24B 31/16* (2006.01)
(Continued)

(52) U.S. Cl.
CPC .............. *B24B 31/16* (2013.01); *B24B 31/02* (2013.01); *B24B 31/06* (2013.01); *B24B 57/02* (2013.01);
(Continued)

(58) Field of Classification Search
CPC ......... B24B 31/16; B24B 31/02; B24B 31/06; B24B 57/02; B24C 3/065; B24C 3/26; H01G 13/00
(Continued)

(56) References Cited

U.S. PATENT DOCUMENTS

| | | | | |
|---|---|---|---|---|
| 4,115,960 A | * | 9/1978 | Zecher ...................... | B24C 3/26 134/134 |
| RE30,977 E | * | 6/1982 | Zecher ...................... | B24C 3/26 134/134 |
| 4,413,448 A | * | 11/1983 | Balz ........................ | B24B 31/06 451/32 |

FOREIGN PATENT DOCUMENTS

| CN | 202114634 | 1/2012 |
|---|---|---|
| CN | 102548712 | 7/2012 |

(Continued)

*Primary Examiner* — George Nguyen
(74) *Attorney, Agent, or Firm* — Drinker Biddle & Reath LLP

(57) ABSTRACT

A polishing device includes a processing vessel into which workpieces are charged, a fluidizing unit that fluidizes the workpieces in the processing vessel, an abrasive-feeding unit that feeds an abrasive into the workpieces, and a suction unit that generates an air flow in a direction in which the abrasive passes through the processing vessel, and recovers the abrasive by suction. The abrasive fed from the abrasive-feeding unit is allowed to pass between the workpieces charged into the processing vessel by the air flow generated from the suction unit while coming into contact with the workpieces. Accordingly, the workpieces are polished.

20 Claims, 11 Drawing Sheets

(51) Int. Cl.
*B24B 31/02* (2006.01)
*B24B 31/06* (2006.01)
*B24C 3/26* (2006.01)
*B24C 3/06* (2006.01)
*B24B 57/02* (2006.01)
*H01G 13/00* (2013.01)

(52) U.S. Cl.
CPC ............... *B24C 3/065* (2013.01); *B24C 3/26* (2013.01); *H01G 13/00* (2013.01)

(58) Field of Classification Search
USPC .......................................................... 451/32
See application file for complete search history.

(56) References Cited

FOREIGN PATENT DOCUMENTS

| | | |
|---|---|---|
| CN | 103180058 | 6/2013 |
| EP | 0649705 | 4/1995 |
| EP | 1825956 A1 | 8/2007 |
| JP | H07-100767 A | 4/1995 |
| JP | 2002-301664 A | 10/2002 |
| JP | 2005-313262 A | 11/2005 |
| JP | 2008-194792 A | 8/2008 |
| JP | 4249079 | 4/2009 |
| JP | 2010-502461 A | 1/2010 |
| WO | WO-2008/029149 A2 | 3/2008 |
| WO | WO-2013/105301 A1 | 7/2013 |

\* cited by examiner

Fig.2
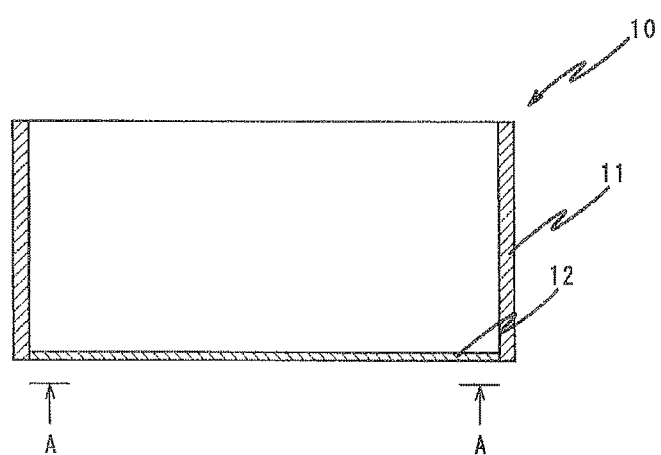
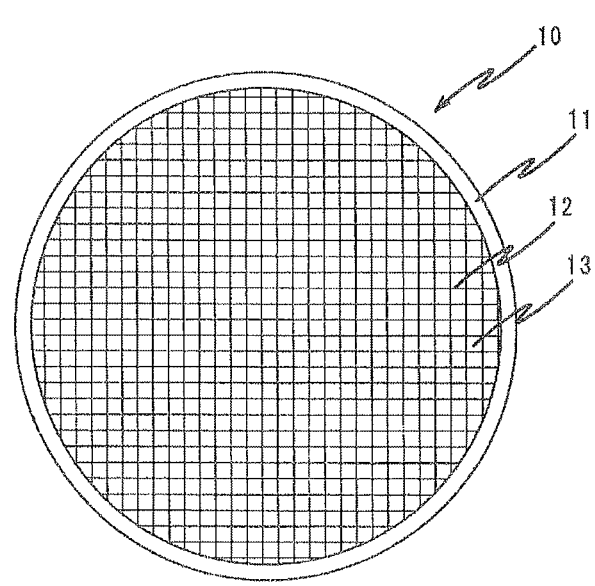

Fig.3 (A)
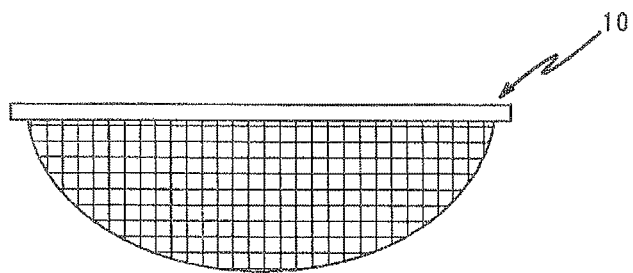
(B)
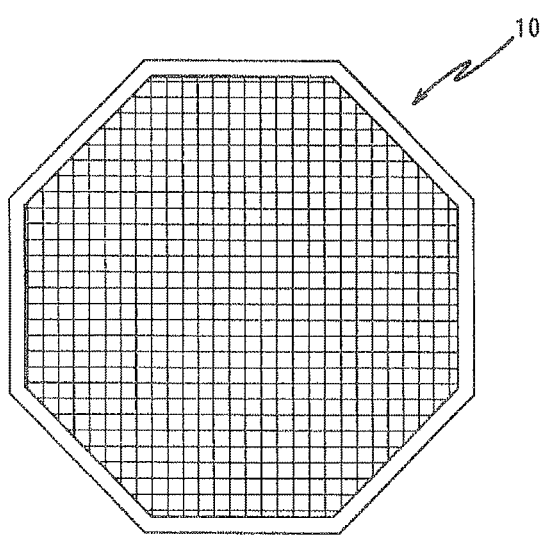
(C)
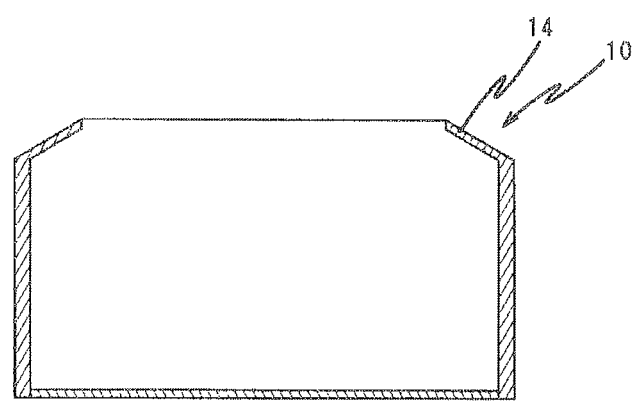

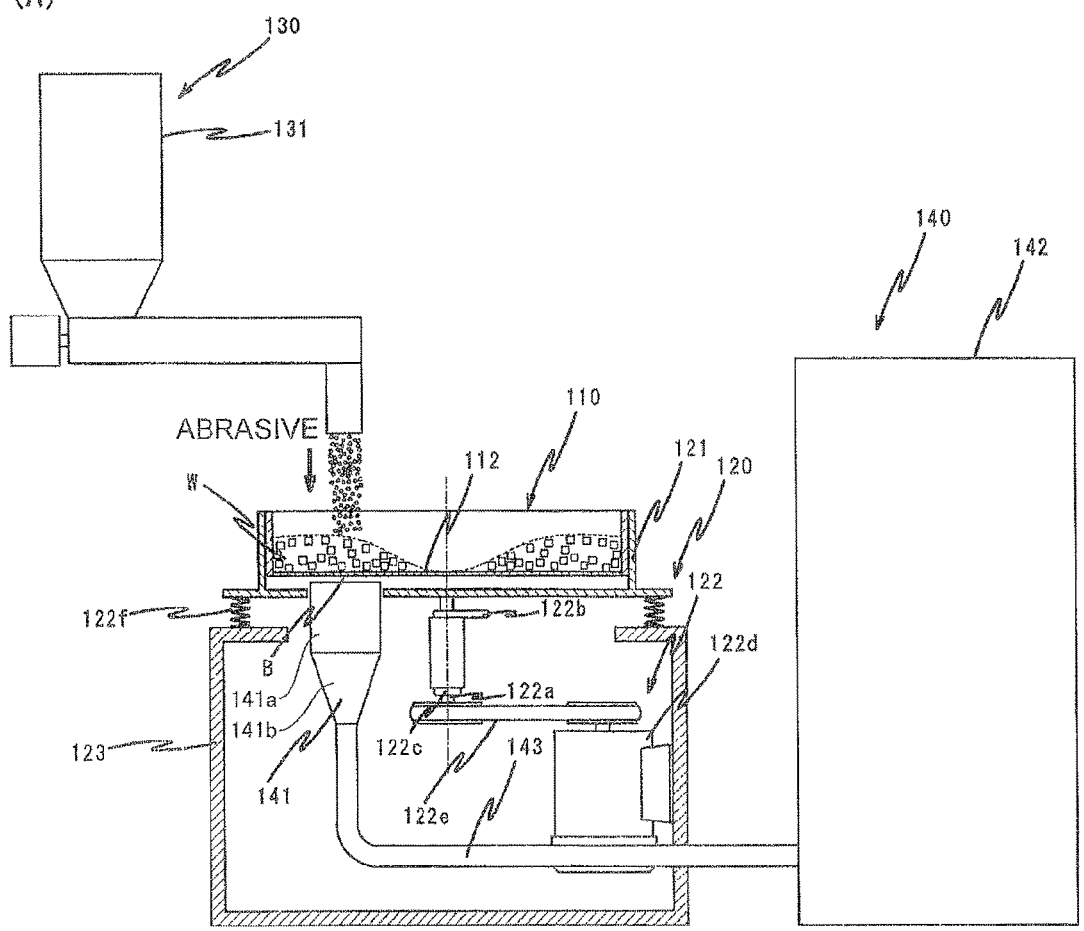
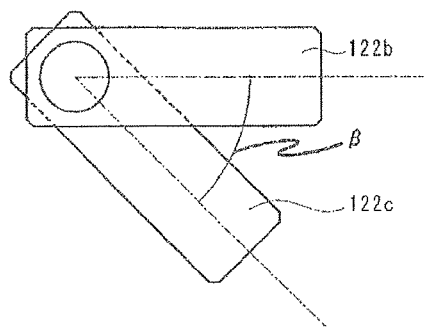

Fig.8
(A)
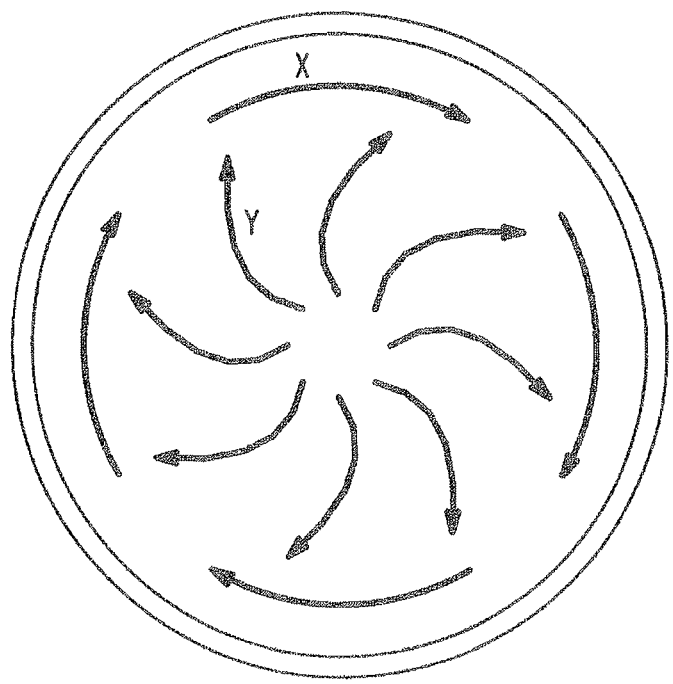
(B)
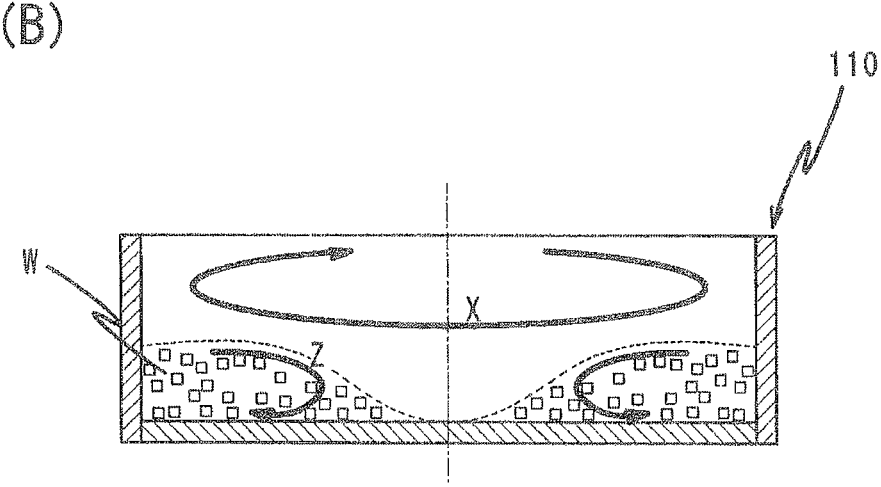

POLISHING DEVICE AND POLISHING METHOD

TECHNICAL FIELD

The present invention relates to a polishing device and a polishing method of workpieces. The present invention relates to a polishing device and a polishing method that are used for small workpieces.

BACKGROUND ART

Processing, which is performed by an air blast device, is widely used as the polishing of workpieces. The air blast device is a device that performs polishing, such as the deburring of surfaces of workpieces, the adjustment of surface roughness, rounding, and the removal of a surface layer, by injecting an abrasive from a nozzle together with compressed air so that the abrasive collides with workpieces.

The size of a workpiece is not particularly limited in the polishing that is performed by a blast device, but a demand for the polishing of small workpieces has increased in recent years. For example, when the workpieces are electronic components, a demand for the polishing of small workpieces has further increased due to the spread of smart phones or tablet terminals.

Since a lot of workpieces can be polished at a time in the polishing performed by an air blast device, the processability of the polishing performed by an air blast device is good. However, since the abrasive is blown to the workpieces together with compressed air as a solid-gas two-phase flow, workpieces having a certain size or weight are scattered. A polishing device and a polishing method, which polish small workpieces, are disclosed in Patent Literature 1. In Patent Literature 1, as illustrated in FIG. 11, auxiliary tumblers into which workpieces are charged are put in a tumbler of a tumbler-type blast device commercially-supplied for general use and blasting is performed during polishing. Accordingly, polishing can be efficiently performed. However, since the auxiliary tumblers are used, the amount of workpieces to be processed is small in regard to the volume of the tumbler. For this reason, a polishing device having higher productivity is required.

Further, there is a case in which workpieces cannot be polished well by a polishing method known in the related art depending on the shape of the workpiece as in cases in which workpieces are very small, are flat, and include grooves. For example, when workpieces including narrow grooves are polished by barrel polishing, polishing media do not easily enter the grooves. For this reason, the workpieces cannot be polished well.

CITATION LIST

Patent Literature

Patent Literature 1: Japanese Unexamined Patent Application Publication No. 2002-301664

SUMMARY OF INVENTION

Technical Problem

That is, a polishing device and a polishing method using new processes instead of the processing using an air blast device are required in this technical field.

Solution to Problem

A polishing device according to an aspect of the invention, which polishes surfaces of workpieces, includes: a processing vessel that includes a bottom surface portion allowing an abrasive to pass therethrough and allows the workpieces to stay on the bottom surface portion; a fluidizing unit that fluidizes the workpieces in the processing vessel; an abrasive-feeding unit that feeds the abrasive to the workpieces present in the processing vessel; and a suction unit that generates an air flow in a direction in which the abrasive passes through the processing vessel, and recovers the abrasive by suction.

An air flow directed toward the suction unit is generated near the processing vessel and in the processing vessel by a suction force that is generated by the suction unit. Since a plurality of workpieces are charged into the processing vessel, the abrasive fed to the workpieces, which are charged into the processing vessel, from the abrasive-feeding unit is directed toward the suction unit by this air flow. The surfaces of the workpieces are polished by the flow of the abrasive. In this case, the workpieces charged into the processing vessel are fluidized in the processing vessel by the fluidizing unit, so that the workpieces are agitated. For this reason, since the surfaces of the workpieces charged into the processing vessel are arbitrarily oriented, all the surfaces of all the workpieces can be uniformly polished. The suction unit may include a suction member, which is disposed so that a gap is formed between the suction member and the processing vessel, in order to efficiently generate this air flow near the processing vessel and in the processing vessel.

Meanwhile, the "feeding of abrasive", which is mentioned here, means that the abrasive is not blown to the workpieces present in the processing vessel unlike in the air blast device and the abrasive is merely fed to the workpieces. For example, when the abrasive-feeding unit is disposed above the processing vessel, the abrasive-feeding unit may merely naturally drop the abrasive toward the processing vessel. Further, the abrasive may be sucked by the suction unit so as to be supplied to the processing vessel. Furthermore, the abrasive may be supplied to the processing vessel by a small force of wind that does not allow the abrasive to be scattered to the surroundings.

In an embodiment, the fluidizing unit may be a vibrating unit that vibrates the processing vessel or a rotating unit that rotates the processing vessel about a center of the bottom surface portion as an axis. According to this embodiment, it is possible to efficiently fluidize the workpieces by a simple structure.

In an embodiment, the fluidizing unit may further include a fluidization control unit that changes a fluidization state. According to this embodiment, it is possible to change the fluidization state of the workpieces according to the shapes, the mass, or the like of the workpieces. For this reason, it is possible to polish all the workpieces.

In an embodiment, the fluidizing unit may be the rotating unit, and the processing vessel may be supported by the rotating unit so as to be inclined with respect to a horizontal plane. According to this embodiment, it is possible to fluidize the workpieces well by appropriately selecting the rotational speed and the inclination angle of the processing vessel according to the properties of the workpieces. Further, when the inclination angle of the processing vessel is selected from the range of 30° to 70° with respect to the horizontal plane, it is possible to more uniformly fluidize the workpieces.

In an embodiment, the bottom surface portion of the processing vessel may be provided with an opening. In this embodiment, the opening allows only the abrasive to pass through the bottom surface portion of the processing vessel by the suction force of the suction unit. That is, only the abrasive, which is present in the processing vessel, can be selectively sucked by the suction unit.

In an embodiment, the opening may be formed in a mesh shape and a mesh size of the opening may be in the range of 70 µm to 1100 µm. Since the opening ratio of the mesh-shaped opening is high in this embodiment, an air flow directed toward the suction unit can be efficiently generated near the processing vessel and in the processing vessel. Further, when the mesh size of the opening is set in the above-mentioned range, it is possible to allow the abrasive to pass through the opening without allowing the workpieces to pass through the opening.

In an embodiment, when suction is performed by the suction unit, an abrasive suction portion where the abrasive passes through the processing vessel and is sucked by the suction unit may be formed on a part of the bottom surface portion of the processing vessel. There is a case in which the fluidization of the workpieces is inhibited when the abrasive suction portion is formed on the entire processing vessel. It is possible to prevent the inhibition of the fluidization of the workpieces, which is caused by suction, by forming the abrasive suction portion on a part of the processing vessel. In an embodiment, for the facilitation of the uniform fluidization of the workpieces, an area of the abrasive suction portion can be set in the range of ⅛ to ¼ of an area of the bottom surface portion. Further, in an embodiment, a suction speed of the abrasive passing through the abrasive suction portion may be 5 m/sec or more and lower than 100 m/sec. Furthermore, in an embodiment, a center of the abrasive suction portion may be positioned so as to be distant from a direction, which is toward a lower end of a peripheral edge portion of the bottom surface portion from the center of the bottom surface portion of the processing vessel, by a predetermined angle in a rotation direction of the processing vessel.

Moreover, in an embodiment, an air flow control member, which controls an air flow allowing the abrasive to pass through the processing vessel, may be disposed at the center of the bottom surface portion of the processing vessel. There is a case in which the fluidization of the workpieces is inhibited when air is sucked near the center of the bottom surface portion of the processing vessel. In this embodiment, it is possible to prevent the inhibition of the fluidization of the workpieces, which is caused by suction, by disposing the air flow control member at the center of the bottom surface portion of the processing vessel.

In an embodiment, the abrasive-feeding unit may include a storage tank that stores the abrasive, an abrasive feeding port through which the abrasive is fed to the workpieces, and a conveyance unit that conveys the abrasive supplied from the storage tank toward the abrasive discharge port. It is possible to continuously feed the abrasive to the workpieces by this structure.

The conveyance unit may include a conveyance screw that includes spiral blades provided on a rotating shaft, and a trough in which the conveyance screw is provided and which includes the abrasive feeding port formed at a lower portion of an end thereof (front side) and an abrasive supply port formed at an upper surface of a rear portion thereof (rear side) so as to be connected to the storage tank. An inner space of the trough may be divided into a space that is formed by the conveyance screw and the trough and a space that is positioned in front of the conveyance screw and includes the abrasive feeding port, and a regulating plate, in which a crushing portion through which the abrasive can pass is formed (opened), may be disposed between an end (front end) of the conveyance screw and the abrasive feeding port. An abrasive feeding portion can remove gas by pressing the abrasive that is sent from the abrasive conveyance portion. In this case, the abrasive is solidified. The solidified abrasive continues to be further advanced and passes through the regulating plate. When the solidified abrasive passes through the crushing portion formed in the regulating plate, the solidified abrasive is crushed and a fixed quantity of the abrasive is conveyed to the supply port. For this reason, the change of the bulk specific gravity of the abrasive, which is caused when gas is mixed to the abrasive in the conveyance unit, does not occur. Further, the deterioration of accuracy of the supply of the abrasive, which is caused by the non-uniformity of the feed of the conveyance unit, does not occur. Accordingly, a fixed quantity of the abrasive can be supplied to the workpieces.

Furthermore, in an embodiment, the workpiece may be made of a hard and brittle material. The above-mentioned polishing device may be used for metal products including castings, forgings, and cut products and nonmetallic products including rubber and plastics, as workpieces. Particularly, the above-mentioned polishing device may also be used for the polishing of workpieces made of hard and brittle materials, which have a hard property and a brittle property, such as ceramics, silicon, ferrite, and crystalline materials, among them. Moreover, in the case of a workpiece made of a hard and brittle material, the above-mentioned polishing device may also be used for the polishing of a component used as a small electronic component like a component, such as a multilayer ceramic capacitor or an inductor.

According to another aspect of the invention, there is provided a polishing method using a polishing device including a processing vessel into which workpieces are charged, a fluidizing unit that fluidizes the workpieces, an abrasive-feeding unit that feeds an abrasive to the workpieces present in the processing vessel, and a suction unit that recovers the abrasive by suction. The polishing method may include: a workpiece-charging step of charging the workpieces into the processing vessel; an air flow generating step of generating an air flow in a direction in which the abrasive passes through the processing vessel by the suction unit; a fluidizing step of fluidizing the workpieces, which are charged into the processing vessel, by the fluidizing unit; an abrasive-feeding step of feeding the abrasive to the workpieces, which are present in the processing vessel, from the abrasive-feeding unit; a polishing step of polishing the workpieces by allowing the abrasive to pass between the workpieces charged into the processing vessel; and an abrasive recovering step of recovering the abrasive by the suction unit. Since the abrasive is not blown to the workpieces in the above-mentioned method unlike in the processing performed by an air blast device, the scattering of the abrasive or the workpieces to the surroundings is prevented. Meanwhile, in the above-mentioned method, the respective steps may be performed in sequence and two or more steps may be simultaneously performed.

A polishing method according to another aspect of the invention uses a polishing device including a processing vessel that includes a bottom surface portion allowing an abrasive to pass therethrough and allowing workpieces to stay thereon and a discharge portion through which the workpieces are discharged to the outside, a fluidizing unit that fluidizes the workpieces, an abrasive-feeding unit that feeds the abrasive to the workpieces present in the processing vessel, and a suction unit that recovers the abrasive by suction. The polishing method includes: a workpiece-charging step of continuously or intermittently charging the workpieces into the processing vessel; an air flow generating step of generating an air flow in a direction in which the abrasive passes through the processing vessel by the suction unit; a fluidizing-advancing step of fluidizing the workpieces, which are present in the processing vessel, by the fluidizing unit and advancing the workpieces, which are charged in the workpiece-charging step, toward the discharge portion; an abrasive-feeding step of feeding the abrasive to the workpieces, which are present in the processing vessel, from the abrasive-feeding unit; a polishing step of polishing the workpieces by allowing the abrasive to pass between the workpieces that are present in the processing vessel; an abrasive recovering step of recovering the abrasive by the suction unit; and a workpiece recovering step of recovering the workpieces that are discharged from the discharge portion. Meanwhile, in the above-mentioned method, the respective steps may be performed in sequence and two or more steps may be simultaneously performed.

In an embodiment, a passage speed of the abrasive, which passes between the workpieces charged into the processing vessel, can be 5 m/sec or more and lower than 100 m/sec.

In an embodiment, the fluidizing unit may be a rotating unit that rotates the processing vessel about a center of the bottom surface portion as an axis, and, in the fluidizing step, the processing vessel may be rotated in the range of 5% to 50% of a critical rotational speed by the rotating unit. Since the workpieces can be efficiently fluidized during polishing in this embodiment, it is possible to achieve uniform polishing without the non-uniformity of the finishing accuracy of all the workpieces.

Advantageous Effects of Invention

According to various aspects and various embodiments of the invention, it is possible to provide a polishing device and a polishing method for small components, which use new processes instead of polishing using an air blast device, and workpieces that are processed by the polishing device. Since an abrasive is not injected to workpieces together with compressed air as a solid-gas two-phase flow in these aspects and embodiments, the workpieces are not scattered to the outside of the processing vessel by the solid-gas two-phase flow. Accordingly, the degradation of a product yield, which is caused by the scattering of the workpieces, does not occur. Further, since the abrasive is not scattered to the surroundings, the degradation of work environment caused by the scattering of the abrasive does not occur.

BRIEF DESCRIPTION OF DRAWINGS

FIG. 2 is a diagram illustrating the shape of a processing vessel of the first embodiment. FIG. 2A is a schematic diagram illustrating the section of the processing vessel viewed from the side, and FIG. 2B is a schematic diagram of the processing vessel viewed in a direction of arrows A-A of FIG. 2A.

FIG. 3 is a schematic diagram illustrating a modification of the processing vessel of the first embodiment. FIG. 3A is a side view of a processing vessel of which a sidewall is formed in a partially spherical shape. FIG. 3B is a bottom view of a processing vessel of which a bottom surface portion is formed in a polygonal shape. FIG. 3C is a sectional view of a processing vessel that includes a flange portion formed at an upper end portion thereof.

FIG. 7 is a schematic diagram illustrating the structure of a polishing device of a second embodiment. FIG. 7A is a schematic diagram illustrating the entire polishing device, and FIG. 7B is a schematic diagram illustrating a positional relationship between a first weight and a second weight.

FIG. 8 is a schematic diagram illustrating the flow of workpieces in a processing vessel of the second embodiment. FIG. 8A is a schematic plan view and FIG. 8B is a schematic sectional view.

DESCRIPTION OF EMBODIMENTS

Figure 1:
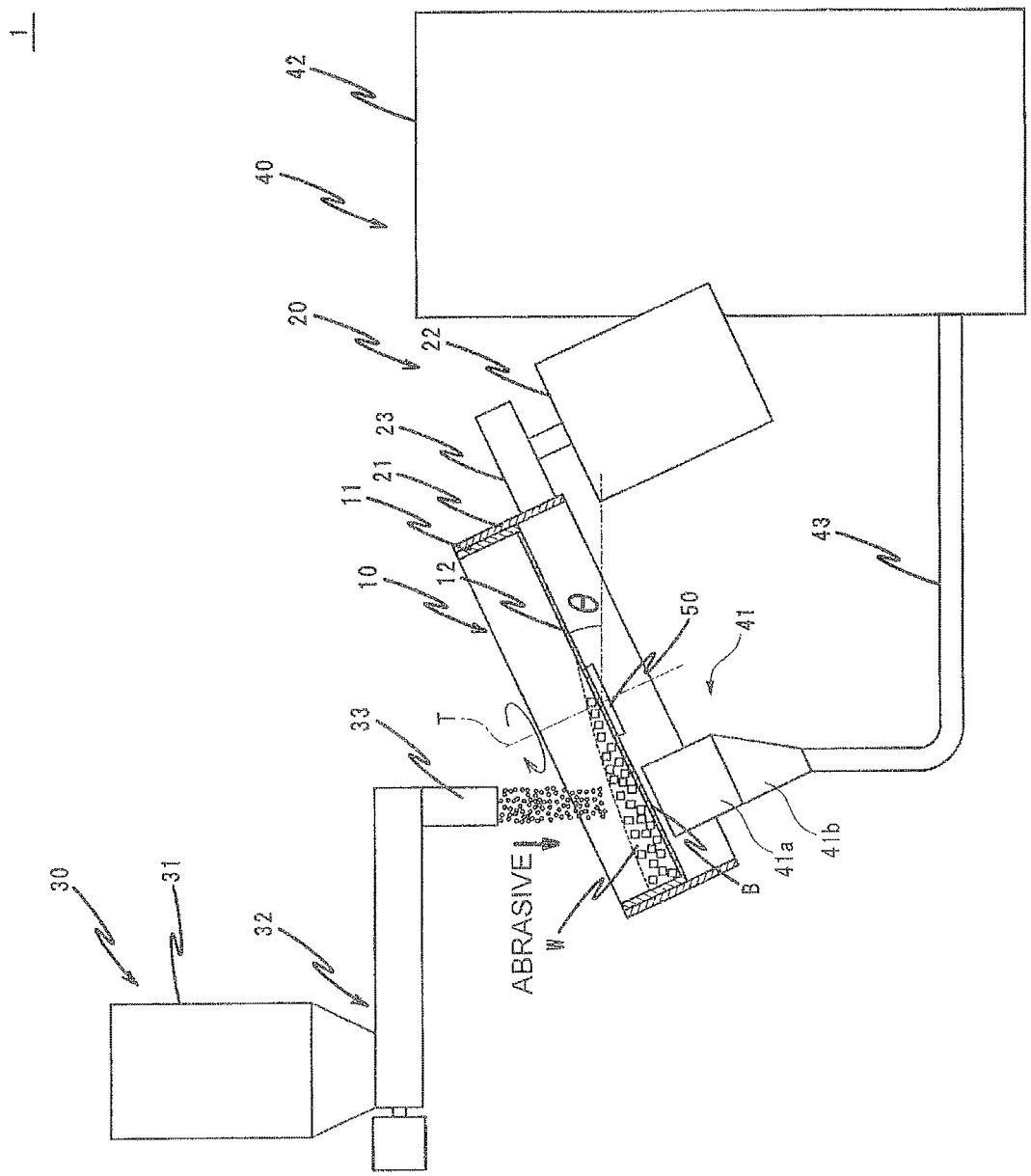
FIG. 1 is a schematic diagram illustrating the structure of a polishing device of a first embodiment.

An example of an embodiment of a polishing device will be described with reference to the drawings. A vertical direction and a horizontal direction in the following description mean directions in the drawings as long as not mentioned. Meanwhile, the invention is not limited to the structure of this embodiment and can be appropriately modified as necessary.

First Embodiment

As illustrated in FIG. 1, a polishing device 1 of this embodiment includes a processing vessel 10, a fluidizing unit, an abrasive-feeding unit 30, and a suction unit 40. In this embodiment, the polishing device includes a rotating unit 20 as the fluidizing unit.

As illustrated in FIG. 2A, the processing vessel 10 includes a wall portion 11 and a bottom surface portion 12. The wall portion 11 has, for example, a cylindrical shape and extends from an edge of the bottom surface portion 12 in a direction crossing the bottom surface portion 12. That is, the wall portion 11 defines a space, which is present on the bottom surface portion 12, from the side. The bottom surface portion 12 is provided with an opening 13. The opening 13 may be formed so as to be partially opened like punching metal, and may be formed so as to be opened as a whole like a mesh shape. In this embodiment, the opening 13 of the bottom surface portion 12 is formed using a mesh-shaped member as illustrated in FIG. 2B.

The opening 13 needs to have a size that allows an abrasive to pass but does not allow workpieces to pass. The diameter of the opening 13 or the mesh size when the opening 13 is formed in a mesh shape, may be set in the range of 70 µm to 1100 µm and may be set in the range of 70 µm to 500 µm. When the bottom surface portion 12 is provided with the opening 13 having a diameter smaller than the size of the workpiece and larger than the particle size of the abrasive, it is possible to allow the abrasive to pass through the bottom surface portion 12 and to allow the workpieces to stay on the bottom surface portion 12.

The shape of the processing vessel 10 may not have a rectangular longitudinal section illustrated in FIG. 2. For example, the processing vessel may be formed in a partially spherical shape as illustrated in FIG. 3A. The spherical shape, which is mentioned here, includes not only a simple spherical shape but also an elliptical shape. Further, the processing vessel may be formed in the shape of a box of which a bottom surface portion 12 has a polygonal planar shape as illustrated in FIG. 3B.

Furthermore, the processing vessel may include a flange portion 14 formed at an upper end portion thereof as illustrated in FIG. 3C so that workpieces W do not flow out of the processing vessel 10. The flange portion 14 extends from an upper end portion of the wall portion 11 so as to be inclined toward the inside of the processing vessel 10 with respect to the extending direction of the wall portion 11. An angle between the wall portion 11 and the flange portion 14 can be in the range of 90° to 150°. In more detail, the angle between the wall portion 11 and the flange portion 14 can be in the range of 90° to 120°. When the angle between the wall portion 11 and the flange portion 14 is excessively small, there is a concern that workpieces W may be caught in a space formed by the wall portion 11 and the flange portion 14. When the angle between the wall portion 11 and the flange portion 14 is excessively large, an effect of the formation of the flange portion 14 cannot be obtained.

As illustrated in FIG. 1, the rotating unit 20 includes a holder 21, a motor 22, and a rotation transmission member 23. The holder 21 has, for example, a cylindrical shape and fixes the processing vessel 10 so as to concentrically surround the wall portion 11 of the processing vessel 10 from the outside. The motor 22 includes a rotating shaft that is rotated by the driving of the motor 22. The rotation transmission member 23 has, for example, a cylindrical shape or a columnar shape and is fixed to an end of the rotating shaft of the motor 22 so that the direction of a central axis of the rotation transmission member 23 corresponds to the direction of an axis of rotation of the motor 22. A cylindrical member made of a material having a large coefficient of friction, such as rubber, can be used as the rotation transmission member 23. Since the outer peripheral surface of the rotation transmission member 23 comes into contact with the holder 21, the rotation transmission member 23 transmits the torque of the motor 22 to the holder 21. Further, the holder 21 is supported by a pedestal (not illustrated) so as to be rotatable about an axis T of rotation orthogonal to the center of the circular cross-section of the holder. When the motor 22 is operated after the processing vessel 10 is fixed to the holder 21, the rotation of the motor 22 is transmitted to the holder 21 through the rotation transmission member 23. Since the holder 21 is rotatably supported by the pedestal, the holder 21 and the processing vessel 10 fixed to the holder 21 are rotated about the axis T of rotation, that is, the center of the bottom surface portion 12 as an axis. Meanwhile, a method of rotating the processing vessel 10 is not limited to the above-mentioned structure. For example, a structure in which teeth are formed on the outer peripheral surface of the holder 21 and a gear capable of meshing with the teeth is fixed to the rotating shaft of the motor 22, a structure in which a pulley is fixed to each of the outer peripheral surface of the holder 21 and the rotating shaft of the motor 22 and the pulleys are connected to each other by a belt, and other known structures may be appropriately used as other structures.

Figure 4:
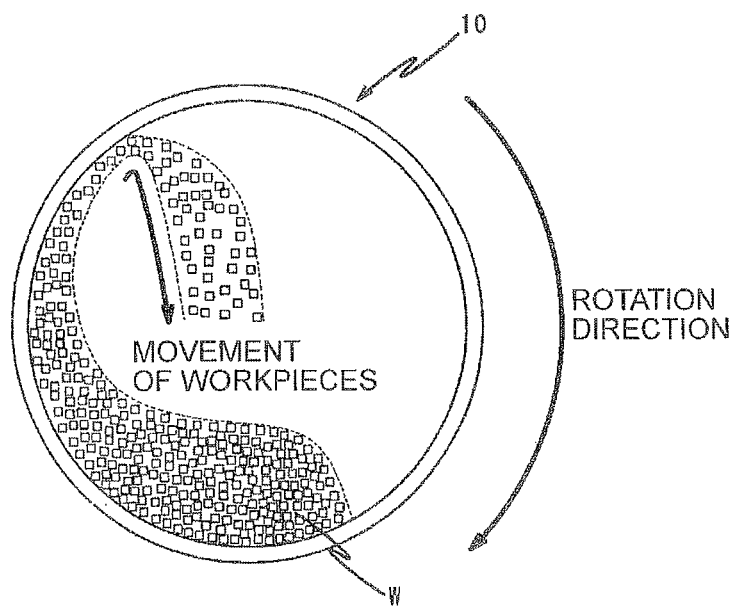
FIG. 4 is a schematic diagram illustrating the flow of workpieces in the processing vessel of the first embodiment.

In one embodiment, the holder 21, that is, the processing vessel 10 may be supported by the rotating unit 20 so as to be inclined with respect to a horizontal plane by a predetermined angle θ. Accordingly, it is possible to facilitate the fluidization of the workpieces W by the rotation of the processing vessel 10 and the action of the gravity. Specifically, as illustrated in FIG. 4, the workpieces W charged into the processing vessel 10 are moved along the wall portion 11 of the processing vessel 10 by a centrifugal force. However, since an influence of the gravity is larger than an influence of the centrifugal force when the workpieces W reach a predetermined position, the workpieces W fall downward. In one embodiment, in order to make this fluidization state, it is possible to set an inclination angle θ of the processing vessel 10 with respect to a horizontal plane in the range of 30° to 70°, and more specifically, to set the inclination angle θ in the range of 40° to 60°. When the inclination angle θ is excessively small, an effect of facilitating the fluidization of the workpieces by the gravity is small. Since the gravity is excessively large relative to a centrifugal force when the inclination angle θ is excessively large, the rotational speed of the processing vessel 10 should be increased.

Further, in one embodiment, the rotational speed of the processing vessel 10 may be set in the range of 5% to 50% of a critical rotational speed, and more specifically, may be set in the range of 10% to 30% thereof. The critical rotational speed means a rotational speed that is obtained when a centrifugal force applied to the workpieces W charged into the processing vessel 10 exceeds the gravity and the workpieces W do not fall from the wall portion 11 of the processing vessel 10 while the rotational speed of the processing vessel 10 is increased. Since an influence of the gravity is excessively larger than an influence of the centrifugal force when the rotational speed is excessively low, the workpieces W are not sufficiently moved along the wall portion 11 of the processing vessel 10. As a result, the fluidization of the workpieces W caused by the fall of the workpieces is not sufficiently performed. Since the gravity is excessively smaller than the centrifugal force when the rotational speed is excessively high, the workpieces W not falling while being pressed against the wall portion 11 of the processing vessel 10 are present. Accordingly, the fluidization of the workpieces W is not sufficiently performed.

When the workpieces W fall, the workpieces W pass through near central portion of the bottom surface portion 12. Since the fluidization, that is, agitation of the workpieces W is performed by the fall of the workpieces W, it is not preferable that the flow of the falling workpieces is disturbed. When the flow of the falling workpieces is disturbed and agitation is inhibited due to the generation of the following suction force at this position, an air flow control member 50 may be provided. In this embodiment, a disc-shaped member is attached to the back of the bottom surface portion 12 as the air flow control member 50 so that a suction force is not generated near the central portion of the bottom surface portion 12 of the processing vessel 10. The diameter of the air flow control member 50 can be in the range of 10% to 40% of the diameter of the bottom surface portion 12.

Figure 5:
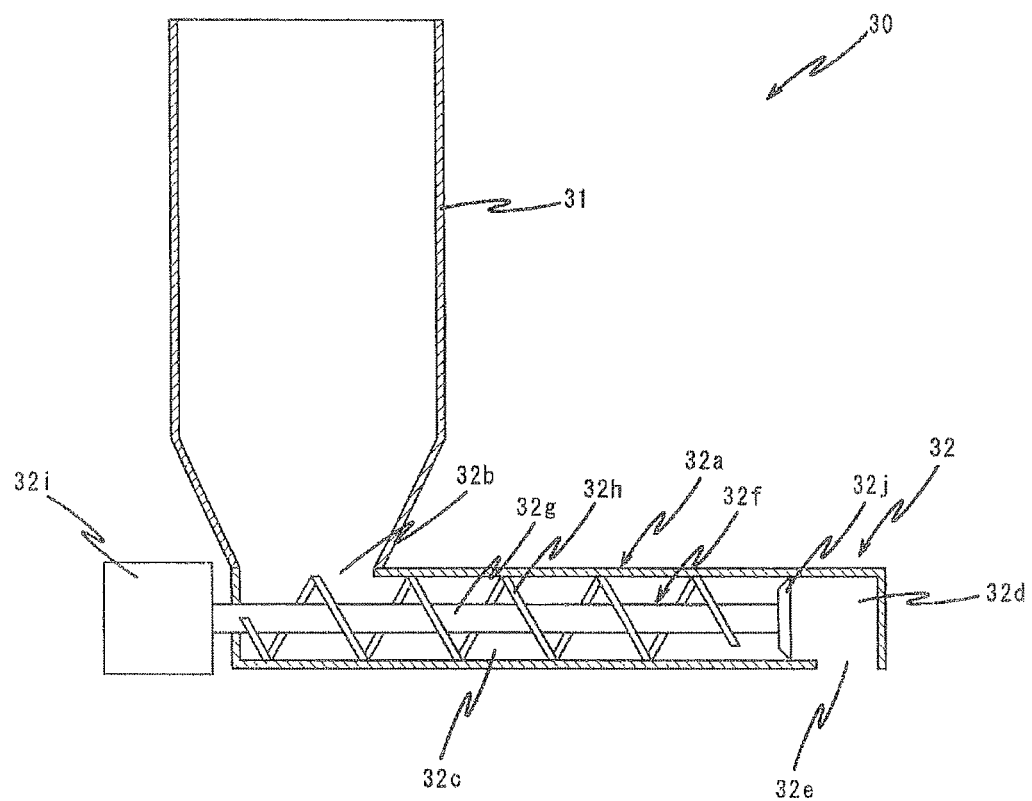
FIG. 5 is a schematic diagram illustrating the structure of an abrasive-feeding unit of the first embodiment.

As illustrated in FIG. 5, the abrasive-feeding unit 30 includes a storage tank 31 and a conveyance unit 32. The conveyance unit 32 includes a cylindrical trough 32a of which both end faces are closed, a conveyance screw 32f that is provided in the trough 32a, and a conveyance motor 32i that is connected to the conveyance screw 32f. The conveyance screw 32f includes a conveyance shaft 32g and conveyance blades 32h. The conveyance blades 32h are spirally fixed to the outer peripheral surface of the conveyance shaft 32g so that adjacent blades are arranged side by side at a predetermined interval.

An abrasive supply port 32b is formed on the upper surface of a rear portion (the left side in FIG. 5) of the trough 32a, and an abrasive discharge port 32e is formed at a lower portion of an end (the right side in FIG. 5). In addition, an inner space of the trough 32a is divided into an abrasive conveyance portion 32c that is formed by the trough 32a and the conveyance screw 32f and an abrasive discharge portion 32d that is positioned in front of the conveyance screw 32f and includes the abrasive discharge port 32e.

The storage tank 31 is a vessel that temporarily stores an abrasive, and includes a straight body that has the same cross-sectional shape toward the lower side and a reduced portion which is connected to the lower end of the straight body and of which a cross-sectional area is reduced toward the lower side. The cross-sectional shape of the straight body may be a circular shape or a polygonal shape. The cross-sectional shape of the straight body is a quadrangular shape in this embodiment. The lower end of the reduced portion is connected to the abrasive supply port 32b to which a base portion of the conveyance unit 32 is exposed.

The rear end of the conveyance shaft 32g passes through the rear end of the trough 32a and is connected to the conveyance motor 32i that can be rotated at an arbitrary speed. When the conveyance motor 32i is operated at an arbitrary speed, the conveyance screw 32f is rotated. An abrasive, which is charged into the trough 32a from the abrasive supply port 32b, is advanced to the right side in FIG. 5 at a constant speed by the rotation of the conveyance screw 32f. That is, a target amount of abrasive can be advanced at a constant speed.

The abrasive, which has passed through the abrasive conveyance portion 32c, enters the abrasive discharge portion 32d and continues to be further advanced. A regulating plate 32j is disposed at the end of the conveyance screw 32f. The regulating plate 32j may be fixed to the end of the conveyance shaft 32g, and the peripheral edge portion of the regulating plate 32j may be fixed to the inner wall of the trough 32a. Further, the regulating plate 32j is provided with a crushing portion (not illustrated) through which the abrasive passes. Since the abrasive is compressed by the regulating plate 32j, air contained in the abrasive is removed and bulk specific gravity is increased. Further, since the crushing portion is formed at the regulating plate 32j, the abrasive of which density reaches a predetermined density in front of the regulating plate 32j and which forms a large lump is crushed when passing through the crushing portion and continues to be advanced. Then, the abrasive is discharged to the outside of the abrasive-feeding unit 30 from the abrasive discharge port 32e. As described above, the abrasive can be fed to the abrasive discharge port 32e by a fixed quantity through the action of the regulating plate 32j without being affected by the change of the bulk specific gravity that is caused when gas is mixed to the abrasive stored in the storage tank 31, being affected by the non-uniformity of the feed speed of the conveyance screw 32f. The abrasive, which forms a large lump, has only to be crushed by the "crushing portion" and has only to be capable of passing through the "crushing portion". For example, as the crushing portion, holes having arbitrary shapes may be formed on the surface of the regulating plate 32j and grooves may be formed at the peripheral edge portion of the regulating plate 32j.

Further, a gap, which is formed between the regulating plate 32j fixed to the end of the conveyance shaft 32g and the inner wall of the trough 32a, may be used as the crushing portion. The abrasive of which density reaches a predetermined density in front of the regulating plate 32j and which forms a large lump is crushed when passing through the gap of the crushing portion and continues to be advanced. Then, the abrasive is discharged to the outside of the abrasive-feeding unit 30 from the abrasive discharge port 32e. Furthermore, the crushing portion may be formed of the combination of the holes formed on the surface of the regulating plate 32j or the grooves formed at the peripheral edge portion and the gap formed between the regulating plate 32j and the inner wall of the trough 32a that have been described above.

The abrasive, which is discharged from the abrasive discharge port 32e, falls toward the workpieces W charged into the processing vessel 10. In this case, a hollow abrasive-feeding member 33 of which both ends are opened may be connected to the abrasive discharge port 32e in order to guide the abrasive so that the abrasive falls toward the workpieces W without being scattered.

Meanwhile, the abrasive has been advanced by the rotation of the conveyance screw 32f in this embodiment. However, instead of this structure, the abrasive may be advanced by the rotation of, for example, a belt stretched forward and rearward or may be advanced by vibration.

The suction unit 40 includes a suction member 41 that is disposed so that a gap is formed between one end face of the suction member 41 and the bottom surface portion 12 of the processing vessel 10, a dust collector 42 that generates a suction force, and a hose 43 that connects the suction member 41 to the dust collector 42. The suction member 41 includes a cylindrical straightening portion 41a of which both ends are opened and which continuously has the same cross-section, and a conical suction portion 41b which is connected to one end face of the straightening portion 41a and of which a cross-sectional area is reduced as it goes away from the straightening portion 41a. The hose 43 is connected to a reduced-diameter end of the suction portion 41b, and the other end of the hose 43 is connected to the dust collector 42 that can recover the abrasive by suction. Accordingly, the suction member 41 and the dust collector 42 are connected to each other.

The suction unit 40 generates an air flow in a direction in which the abrasive passes through the bottom surface portion 12 of the processing vessel 10, that is, an air flow directed toward the suction member 41 from the abrasive-feeding member 33. The straightening portion 41a of the suction member 41 serves to straighten the air flow so that the air flow generated during suction flows toward the dust collector 42 without flowing back to the outside. Further, the suction portion 41b serves to accelerate the air flow so that the air flow having passed through the straightening portion 41a efficiently flows toward the dust collector 42. Meanwhile, if the abrasive can be sucked by only the suction portion 41b without being scattered to the outside of the suction member 41, the straightening portion 41a may not be provided.

The size of an open end of the suction member 41 (an end of the suction member 41 opposite to the reduced-diameter end) may be slightly larger than the size of the bottom surface portion 12 of the processing vessel 10 so that the abrasive can be sucked from the entire bottom surface portion 12. Alternatively, the size of the open end of the suction member 41 may be smaller than the size of the bottom surface portion 12 so that the abrasive can be sucked from a part of the bottom surface portion 12. Further, the open end of the suction member 41 may be disposed so that a gap is formed between the open end of the suction member 41 and the bottom surface portion 12 of the processing vessel 10. In this embodiment, the size of the open end of the suction member 41 is smaller than the size of the bottom surface portion 12 of the processing vessel so that the abrasive can be sucked from a part of the bottom surface portion 12, and the abrasive-feeding unit 30 is disposed so that the abrasive can be fed to a position facing the open end. Meanwhile, if the abrasive can be sucked by only the hose 43 without being scattered to the outside, the suction member 41 may not be provided.

Figure 6:
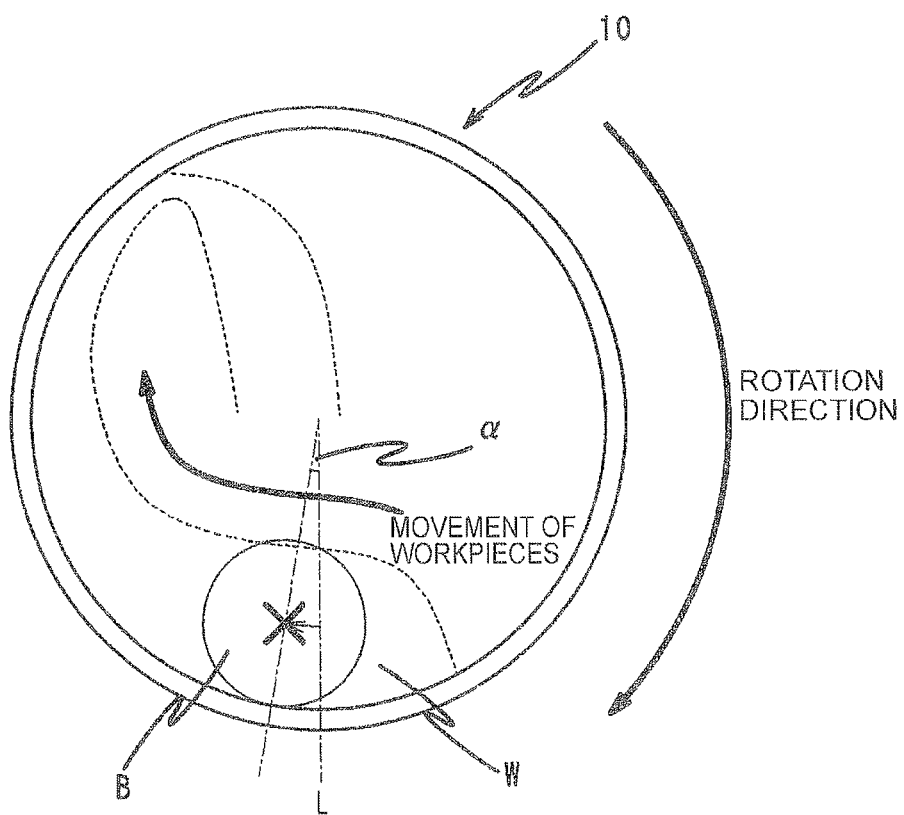
FIG. 6 is a diagram illustrating the position of an abrasive suction portion of the first embodiment.

When the dust collector 42 is operated, an abrasive suction portion B where the abrasive passes through the bottom surface portion 12 and is sucked by the suction member 41 is formed at a position on the bottom surface portion 12 facing the open end of the suction member 41 as illustrated in FIG. 6. That is, the abrasive suction portion B is a region of the bottom surface portion 12 through which the abrasive passes. The area of the abrasive suction portion B may be set in the range of 10% to 40% of the area of the bottom surface portion 12 of the processing vessel 10. Further, in one embodiment, the area of the abrasive suction portion B may be set in the range of ⅛ to ¼ of the area of the bottom surface portion 12. Since superfluous workpieces W are fixed to the bottom surface portion 12 when the area of the abrasive suction portion B is excessively large, the agitation of the workpieces W is insufficient. When the area of the abrasive suction portion B is excessively small, it is not possible to sufficiently perform the suction of the abrasive. Meanwhile, the shape of the abrasive suction portion B is a circular shape in an example illustrated in FIG. 6, but the shape of the abrasive suction portion B is not limited to a circular shape. For example, the shape of the abrasive suction portion B may be a polygonal shape, a belt shape that is formed along the edge of the bottom surface portion 12, or a fan shape of which a part of the outer periphery is formed along the edge of the bottom surface portion 12. It is possible to change the shape of the abrasive suction portion B into a desired shape by changing the planar shape of the open end of the suction member 41.

In one embodiment, the suction speed of the abrasive passing through the abrasive suction portion B may be 5 m/sec or more and lower than 100 m/sec, may be 5 m/sec or more and lower than 50 m/sec, and may be 5 m/sec or more and lower than 30 m/sec. Since a force for sucking the abrasive fed from the abrasive-feeding unit 30 to the suction unit 40 is small when the suction speed is excessively low, it is not possible to sufficiently suck the abrasive. Since the workpieces W charged into the processing vessel 10 are fixed to the bottom surface portion 12 by a suction force generated from the dust collector 42 when the suction speed is excessively high, the fluidization of the workpieces W is inhibited.

In addition, the passage speed of the abrasive, which passes between the workpieces W charged into the processing vessel 10, needs to be adjusted to 5 m/sec or more and lower than 100 m/sec. This passage speed may be 5 m/sec or more and lower than 50 m/sec, and more specifically, may be 5 m/sec or more and lower than 30 m/sec. Since a force causing the abrasive to collide with or come into contact with the workpieces W is small when the passage speed is excessively low, it is not possible to perform the polishing of the workpieces W. Since a force causing the abrasive to collide with or come into contact with the workpieces W is large when the passage speed is excessively high, cracks or chippings are likely to be generated on the workpieces W during the polishing. A method of adjusting the passage speed may be performed by the adjustment of a distance between the abrasive-feeding unit 30 and the processing vessel 10, and may be performed by the adjustment of the suction force of the dust collector 42.

Further, the position of the abrasive suction portion B may be set so that the center of the abrasive suction portion B is positioned at a position distant from a direction, which is toward the lower end of the peripheral edge portion of the bottom surface portion 12 of the processing vessel 10 (an imaginary line extending toward the lower end in FIG. 6, that is, an imaginary line L extending from the center of the bottom surface portion 12 in an inclination direction of the bottom surface portion 12), by a predetermined angle α in a rotation direction of the processing vessel 10 as illustrated by a mark "x" of FIG. 6. The reason for this is that the workpieces W are moved in the rotation direction in accordance with the rotation of the processing vessel 10 as illustrated by a dotted line when the processing vessel 10 is rotated. The angle α may be selected from a range that is larger than 0° and not larger than 45°. When the angle α is excessively large, the agitation of the workpieces W cannot be efficiently performed.

In another embodiment in which the abrasive suction portion B is formed only on a part of the bottom surface portion 12 of the processing vessel 10, a plate, which includes openings such as slits formed on the back of a bottom surface portion 12 thereof, may be disposed so that a gap is formed between the plate and the bottom surface portion 12. In this case, the size of the open end of the suction member 41 may be slightly larger than the size of the bottom surface portion 12 of the processing vessel 10. Since the abrasive can be sucked from the entire processing vessel 10 due to this structure, the scattering of the abrasive can be further suppressed. As a result, the degradation of work environment can be reduced.

Since the inside of the suction member 41 is sucked through the hose 43 when the dust collector 42 is operated, the abrasive having passed through the processing vessel 10 is sucked toward the suction member 41. In this case, since an air flow directed inward from the outside is generated near the open end of the suction member 41, the abrasive having passed through the processing vessel 10 is not scattered to the outside of the suction member 41. However, since the outside air cannot be sufficiently sucked when the gap formed between the processing vessel 10 and the open end of the suction member 41 is excessively small, the air flow directed inward from the outside of the suction member 41 is not generated. Further, when the gap is excessively large, the air flow directed inward from the outside of the suction member 41 is not generated due to a pressure loss. Accordingly, there is a concern that the abrasive having passed through the processing vessel 10 may be scattered to the outside of the suction member 41 even when the gap is excessively large or excessively small. The gap, which is formed between the processing vessel 10 and the suction member 41 when the processing vessel 10 is closest to the suction member 41, may be set in the range of 1 mm to 25 mm and, and more specifically, may be set in the range of 5 mm to 15 mm.

The abrasive, which is recovered by the dust collector 42, contains fine particles, such as an abrasive of which the size is reduced due to the generation of cracks or chippings caused by the contact between the workpieces W and the abrasive or polishing waste of the workpieces W, in addition to abrasive that can be used again. A classifying unit may be further provided to recover the abrasive, which can be used again, from the abrasive and the fine particles. The abrasive is classified into the abrasive, which can be used again, and fine particles by the classifying unit, and the abrasive, which can be used again, can be returned to the storage tank 31. The classifying unit may be provided on a path, which is directed toward the dust collector 42 from the suction member 41, and may be provided on a separate path. The classifying unit can include a known device, such as an air flow classifier or a sieve.

A fluidization control unit (not illustrated), which controls (changes) the fluidization state of the workpieces W present in the processing vessel 10, may be further used. Examples of the fluidization control unit include a unit that arbitrarily changes the inclination angle θ of the processing vessel 10 and a unit that arbitrarily changes the rotational speed of the motor 22. It is possible to change the fluidization state of the workpieces W by changing the angle or the speed according to the progression of polishing. Accordingly, the workpieces W can be fluidized under conditions corresponding to properties and the like of all the workpieces W. In addition, when chippings or cracks of the workpieces W are easily generated, it is possible to prevent the chippings or cracks of the workpieces W at the time of the start of fluidization.

Next, an example of a polishing method using the polishing device of this embodiment will be described with reference to the drawings. Here, a polishing method of rounding corners of ceramics (dimensions; 0.5 mm×0.5 mm×1.0 mm), which are made of a mixture of SiC and $Al_2O_3$, as the workpieces W will be described.

(Step 1: Preparing Step)

An abrasive is charged into the storage tank 31 illustrated in FIG. 1 in advance. The size of the abrasive, which is charged in this case, is smaller than the diameter of the opening 13 of the processing vessel 10 or the mesh size when the opening 13 is formed in a mesh shape. The reason for this is to allow the abrasive to pass through the opening 13 of the processing vessel 10 during polishing. Further, polishing conditions are input to a controller (not illustrated) that is provided at an arbitrary position on the polishing device 1 and controls the motor 22, the conveyance motor 32i, and the dust collector 42. The "polishing conditions", which are mentioned here, means polishing time, operating conditions of the motor 22, the feeding rate of the abrasive (the amount of the abrasive to be fed per unit time), an operating pattern, and the like.

The abrasive can be appropriately selected from various particles, such as metallic or nonmetallic shots, grids, or cut wires, ceramics-based particles, plant-based particles, and resin-based particles, according to the material or shape of the workpiece and processing purposes. It is possible to select an alumina-based particle, a silicon carbide-based particle, a zirconia-based particle, and the like, which are high-hardness particles, as the abrasive, for example, to round the workpieces with a large radius to remove firm burrs. Further, particles, which are made of the same material as the workpieces, may be used as the abrasive for the prevention of the adhesion of foreign materials, which are caused by polishing, to the workpieces. In this case, when a magnetic material, which is the same material as the workpiece, is used as the abrasive for the polishing of an electronic component made of, for example, a magnetic material, foreign materials do not adhere to the surfaces of the polished workpiece. Accordingly, it is possible to prevent the deterioration of the performance of the electronic component that is caused by foreign materials.

The shape of the abrasive may be a spherical shape, a columnar shape, the shape of a rectangular parallelepiped, an anisotropic shape, or the like without being particularly limited, and can be appropriately selected according to the material or shape of the workpiece and processing purposes.

Likewise, the particle size of the abrasive can also be appropriately selected according to the material or shape of the workpiece and processing purposes. For example, when ceramics-based particles are used as the abrasive, a particle size defined by JIS (Japanese Industrial Standards) B6001 can be appropriately selected from F220 or the range of #240 to #1000.

An anisotropic alumina-based particle having a particle size of #800 is used as the abrasive of this embodiment.

(Step 2: Workpiece-Charging Step)

Next, the workpieces W are charged into the processing vessel 10. After that, the processing vessel 10 is fixed to the holder 21 by bolts or the like.

(Step 3: Air Flow Generating Step)

Next, when an operation switch (not illustrated) of the controller is turned on, the dust collector 42 is operated and an air flow to be sucked toward the suction member 41 is generated near the abrasive suction portion B. Here, the dust collector 42 can adjust the suction force generated by the dust collector 42 so that the passage speed of the abrasive passing between the workpieces W charged into the processing vessel 10 is in the above-mentioned range. In addition, a distance between the processing vessel 10 and the abrasive-feeding unit 30 can be adjusted.

(Step 4: Fluidizing Step)

Further, when the motor 22 is operated and the holder 21, that is, the processing vessel 10 is rotated, the workpieces W present in the processing vessel 10 are fluidized and agitated as illustrated in FIG. 4. Here, the rotational speed of the processing vessel 10 can be set in the range of 5% to 50% of a critical rotational speed, and more specifically, can be set in the range of 10% to 30% thereof as described above.

(Step 5: Abrasive-Feeding Step)

Next, the conveyance motor 32i of the abrasive-feeding unit 30 is operated and the abrasive is fed to (falls toward) the workpieces W, which are charged into the processing vessel 10, from the abrasive discharge port 32e at a constant speed.

(Step 6: Polishing Step)

In the processing vessel 10, an air flow to be sucked toward the suction member 41 is also generated in the gap between the workpieces W that are being fluidized. The abrasive charged into the processing vessel 10 is allowed to pass through the gap between the workpieces W by this air flow, and is directed toward the suction member 41. In this case, since the abrasive and the workpieces W are rubbed with each other, the workpieces W are polished. Further, since the workpieces W are being fluidized in the processing vessel 10 as illustrated in FIG. 4, it is possible to uniformly polish all the workpieces W without the non-uniformity of the finishing accuracy of all the workpieces W. Since the polishing device of this embodiment does not blow the abrasive to the workpieces W together with compressed air as a solid-gas two-phase flow unlike an air blast device, the workpieces W can be polished without being scattered from the processing vessel even though the workpieces W are small and light.

(Step 7: Abrasive Recovering Step)

The abrasive having passed through the processing vessel 10 is directed toward the suction member 41 by the air flow to be sucked toward the dust collector 42. Since a small gap is formed between the processing vessel 10 and the suction member 41, an air flow directed inward from the outside of the suction member 41 is generated by the suction of outside air. For this reason, all the abrasive having passed through the processing vessel 10 is directed toward the suction member 41 without being scattered to the outside.

The abrasive present in the suction member 41 is recovered through the hose 43 by the dust collector 42.

It is possible to polish the workpieces W by the above-mentioned steps.

When the polishing time input to the controller has passed, the abrasive-feeding unit 30 is automatically stopped so that the feeding of the abrasive is stopped. In this case, since the motor 22 and the dust collector 42 continue to be operated, the abrasive remaining in the processing vessel 10 is recovered by the dust collector 42. After a predetermined time has passed, the motor 22 is stopped and the dust collector 42 is then stopped.

After the processing vessel 10 is separated from the holder 21 and the workpieces W are recovered, polishing is completed.

It was possible to round the workpieces W by using the above-mentioned polishing method.

Next, results of the polishing of workpieces, which is performed using the polishing device of the first embodiment, will be described. Here, polishing was performed to round the corners of workpieces, fluidization (fluidization state) was evaluated, polished workpieces were evaluated, and environment after polishing was evaluated.

(Evaluation of Fluidization)

First, the evaluation of fluidization will be described. A raw material (a material that is not sintered yet) of ceramics, which are made of a mixture of SiC and $Al_2O_3$, was used as the workpieces W. The workpiece W had dimensions of 0.5 mm×0.5 mm×1.0 mm. The half of the workpieces W was painted in black with an oil paint.

Next, the workpieces W are charged into the processing vessel 10 so as to occupy about ⅕ of the volume of the processing vessel 10. The workpieces W were charged so that a ratio of the unpainted workpieces to the painted workpieces is 1:1.

Then, after the dust collector 42 is operated, the processing vessel 10 is rotated for 30 minutes to fluidize the workpieces W. Meanwhile, conditions of the fluidization (agitation) were set as in Table 1. The respective evaluation conditions of Table 1 are as follows:

Inclination angle (deg.); an inclination angle θ of the processing vessel 10 with respect to a horizontal plane Rotational speed (%); the rotational speed of the processing vessel 10/the critical rotational speed×100

Area; the area of the abrasive suction portion B/the area of the bottom surface portion 12 of the processing vessel 10

Suction speed (mm/s); the speed of wind to be sucked at the abrasive suction portion B Position (deg.); a phase angle α in the rotation direction of the processing vessel 10 from an imaginary line that extends toward the lower end of the peripheral edge portion of the bottom surface portion 12 from the center of the bottom surface portion 12 as a reference Presence or absence of the air flow control member 50; whether or not the air flow control member 50 having a diameter of ⅓ of the diameter of the bottom surface portion is disposed on the back of the bottom surface portion 12 of the processing vessel 10

When 30 minutes has passed, the operation of the processing vessel 10 and the dust collector 42 is stopped. After the operation is stopped, 100 workpieces W are collected at each of the positions where the above-mentioned phase angle is 0°, −10°, and 10° and the number of unpainted workpieces was counted. This work was performed three times and an average value of the numbers of the unpainted workpieces obtained three times at three positions was calculated for the evaluation of the fluidization state of the workpieces W. Evaluation criteria are as follows:

◎ . . . The number of unpainted workpieces is in the range of 45 to 55.

○ . . . The number of unpainted workpieces is in the range of 40 to 44 or the range of 56 to 60.

Δ . . . The number of unpainted workpieces is in the range of 30 to 39 or the range of 61 to 70.

x . . . The number of unpainted workpieces is 29 or less or 71 or more.

TABLE 1

| | Evaluation condition | | | | | | |
|---|---|---|---|---|---|---|---|
| | Inclination angle (deg.) | Rotational speed (%) | Suction portion | | | Presence or absence of control member | Evaluation of fluidization |
| | | | Suction speed (m/s) | Area | Position (deg.) | | |
| Example 1-1 | 20 | 65 | 15 | 1/5 | 45 | Absence | Δ |
| Example 1-2 | 40 | 65 | 15 | 1/5 | 45 | Absence | ○ |
| Example 1-3 | 50 | 65 | 15 | 1/5 | 45 | Absence | ○ |
| Example 1-4 | 60 | 65 | 15 | 1/5 | 45 | Absence | ○ |
| Example 1-5 | 45 | 50 | 15 | 1/5 | 45 | Absence | Δ |
| Example 1-6 | 45 | 60 | 15 | 1/5 | 45 | Absence | ○ |
| Example 1-7 | 45 | 70 | 15 | 1/5 | 45 | Absence | ○ |
| Example 1-8 | 45 | 80 | 15 | 1/5 | 45 | Absence | ○ |
| Example 1-9 | 45 | 65 | 5 | 1/5 | 45 | Absence | ○ |
| Example 1-10 | 45 | 65 | 10 | 1/5 | 45 | Absence | ○ |
| Example 1-11 | 45 | 65 | 30 | 1/5 | 45 | Absence | ○ |
| Example 1-12 | 45 | 65 | 50 | 1/5 | 45 | Absence | Δ |
| Example 1-13 | 45 | 65 | 100 | 1/5 | 45 | Absence | Δ |
| Example 1-14 | 20 | 50 | 15 | 1/8 | 45 | Absence | Δ |
| Example 1-15 | 20 | 50 | 15 | 1/6 | 45 | Absence | ○ |
| Example 1-16 | 20 | 50 | 15 | 1/4 | 45 | Absence | ○ |
| Example 1-17 | 20 | 50 | 15 | 1/5 | 10 | Absence | Δ |
| Example 1-18 | 20 | 50 | 15 | 1/5 | 40 | Absence | ○ |
| Example 1-19 | 20 | 50 | 15 | 1/5 | 50 | Absence | ○ |
| Example 1-20 | 20 | 50 | 15 | 1/5 | 60 | Absence | Δ |
| Example 1-21 | 45 | 65 | 15 | 1/5 | 45 | Presence | ◎ |

The evaluation of fluidization was summarized in Table 1. In Examples 1-1 to 1-20, the air flow control member 50 was not disposed and the workpieces W were agitated. As a result, evaluation was "Δ" or "○" even in every condition. The evaluation "Δ" is a level in which the occurrence of non-uniformity does not cause problems about actual workpieces when polishing is actually performed, and it was confirmed by experiments that practical problems were not generated. Further, the evaluation "Δ" is a level that is changed into the evaluation "○" by the optimization of the other conditions. Accordingly, it was confirmed that the workpieces W could be agitated well under the conditions of Table 1. Meanwhile, Example 1-4 had evaluation "○" in terms of qualitative evaluation, but was slightly inferior to Example 1-3 in terms of quantitative evaluation. Likewise, Example 1-9 was slightly inferior to Example 1-10 in terms of quantitative evaluation.

Further, when the air flow control member 50 was disposed on the back of the bottom surface portion 12 of the processing vessel 10 (Example 1-20), evaluation "⊙" was obtained. Accordingly, it was confirmed that workpieces could be more uniformly agitated.

(Evaluation of Polished Workpieces and Evaluation of Environment after Polishing)

Next, the evaluation of polished workpieces and the evaluation of environment after polishing will be described. Results of polishing of workpieces, which is performed for polishing time of 30 minutes after alumina abrasive grains (WA#800 manufactured by Sintokogio, Ltd.) are fed at a feeding rate of 20 g/min by the abrasive-feeding unit 30, will be described. Six types of workpieces were used in this evaluation. The detail of the workpieces will be described below.

Workpiece A; a raw material of ceramics made of a mixture of SiC and $Al_2O_3$ (dimensions; 0.5 mm×0.5 mm×1.0 mm)

Workpiece B; a raw material of ceramics made of a mixture of SiC and $Al_2O_3$ (dimensions; 0.15 mm×0.15 mm×0.20 mm)

Workpiece C; a raw material of ceramics made of a mixture of SiC and $Al_2O_3$ (dimensions; 1.0 mm×1.0 mm×1.5 mm)

Workpiece D; ferrite (dimensions; 0.5 mm×0.5 mm×1.0 mm)

Workpiece E; glass (dimensions; 0.5 mm×0.5 mm×1.0 mm)

Workpiece F; copper (dimensions; 0.5 mm×0.5 mm×1.0 mm)

The workpieces are charged into the processing vessel 10 so as to occupy about ⅕ of the volume of the processing vessel 10. Further, after the dust collector 42 is operated, the processing vessel 10 is rotated for 30 minutes to fluidize the workpieces. Meanwhile, conditions of the fluidization (agitation) were set as in Table 2. In terms of the respective evaluation conditions of Table 2, an inclination angle, a rotational speed, an area, a position, and the presence or absence of the air flow control member are the same as the contents of the evaluation conditions described in the evaluation of fluidization. A passage speed, which is an evaluation condition different from the conditions for the evaluation of fluidization, will be described below.

Passage speed (mm/s); the speed of the abrasive that passes between the workpieces charged into the processing vessel 10

The passage speed was evaluated through the measurement of the fluid speed of the abrasive that is performed by a flow rate measuring system (a PIV system manufactured by Flowtech Research Inc.). Specifically, the speed of the abrasive was measured immediately before the abrasive fed from the abrasive-feeding unit 30 comes into contact with the workpieces W, and a measured value was defined as the passage speed.

Next, alumina abrasive grains (WA#800 manufactured by Sintokogio, Ltd.) were charged into the storage tank 31 and the conveyance motor 32$i$ was operated so that the feeding rate of the abrasive was 20 g/min. The processing vessel 10 and the dust collector 42 were operated to perform polishing for 30 minutes.

Polished workpieces were evaluated. Specifically, "processing accuracy", "surface state", and "remaining of abrasive" were evaluated. Evaluating methods and evaluation criteria for "processing accuracy", "surface state", and "remaining of abrasive" are as follows:

<Processing Accuracy>

10 workpieces polished under each condition were collected and were observed by a microscope (VHX-2000 manufactured by Keyence Corporation), and the rounding of the corners of the workpieces was evaluated. Evaluation criteria for the processing accuracy are as follows:

○ . . . All workpieces are rounded.

Δ . . . The number of workpieces, which are not subjected to rounding, is in the range of 1 to 3.

x . . . The number of workpieces, which are not subjected to rounding, is 4 or more.

<Surface State>

10 workpieces W polished under each condition were collected and were observed by a microscope (VHX-2000 manufactured by Keyence Corporation), and the surface states (the presence or absence of cracks, chippings, and scratches) of the workpieces were evaluated. Evaluation criteria for the surface states are as follows:

○ . . . Cracks or chippings are not observed from all workpieces.

Δ . . . The number of workpieces on which cracks or chippings are present is in the range of 1 to 3.

x . . . The number of workpieces on which cracks or chippings are present is 4 or more.

<Remaining of Abrasive>

Workpieces polished under each condition are classified into polished workpieces and adhered materials, which are adhered to the workpieces, by sieving using an ultrasonic vibration sieve. The mesh size of a sieve used for sieving is set so that the polished workpieces do not pass through the sieve and only adhered materials pass through the sieve. Then, the weight of the workpieces from which the adhered materials have been removed and the weight of the adhered materials are measured. Further, the residual ratio of the abrasive was calculated from "(the weight of the adhered materials)/(the weight of the workpieces from which the adhered materials have been removed)×100(%)", and the remaining of the abrasive was evaluated. Evaluation criteria for the "remaining of abrasive" are as follows:

○ . . . The residual ratio of the abrasive is lower than 1%.

Δ . . . The residual ratio of the abrasive is in the range of 1% to 3%.

x . . . The residual ratio of the abrasive is 3% or more.

In addition, environment after polishing was evaluated. Specifically, "scattering of abrasive" was evaluated. An evaluating method and evaluation criteria are as follows:

<Scattering of Abrasive>

After workpieces are polished under each condition, the "scattering of abrasive" was evaluated for the investigation of the degree of the abrasive that was scattered to the periphery of the polishing device 1 having completely performed polishing during the polishing step. Evaluation criteria for the "scattering of abrasive" are as follows:

○ . . . Abrasive is not visually observed outside the processing vessel 10 after polishing.

x . . . Abrasive is visually observed outside the processing vessel 10 after polishing.

TABLE 2

| | | Evaluation condition | | | | | | Evaluation of workpiece | | | |
|---|---|---|---|---|---|---|---|---|---|---|---|
| | | | | | Suction portion | | Presence or | | | Remaining | Scattering |
| | Type of workpiece | Inclination angle (deg.) | Rotational speed (%) | Passage speed (m/s) | Area | Position (deg.) | absence of control member | Processing accuracy | Surface state | of abrasive | of abrasive |
| Example 2-1 | Workpiece A | 20 | 65 | 15 | 1/5 | 45 | Absence | Δ | ◯ | Δ | ◯ |
| Example 2-2 | Workpiece A | 40 | 65 | 15 | 1/5 | 45 | Absence | ◯ | ◯ | ◯ | ◯ |
| Example 2-3 | Workpiece A | 50 | 65 | 15 | 1/5 | 45 | Absence | ◯ | ◯ | ◯ | ◯ |
| Example 2-4 | Workpiece A | 60 | 65 | 15 | 1/5 | 45 | Absence | Δ | Δ | Δ | ◯ |
| Example 2-5 | Workpiece A | 45 | 50 | 15 | 1/5 | 45 | Absence | Δ | ◯ | ◯ | ◯ |
| Example 2-6 | Workpiece A | 45 | 60 | 15 | 1/5 | 45 | Absence | ◯ | ◯ | ◯ | ◯ |
| Example 2-7 | Workpiece A | 45 | 70 | 15 | 1/5 | 45 | Absence | ◯ | ◯ | ◯ | ◯ |
| Example 2-8 | Workpiece A | 45 | 80 | 15 | 1/5 | 45 | Absence | ◯ | Δ | Δ | ◯ |
| Example 2-9 | Workpiece A | 45 | 65 | 5 | 1/5 | 45 | Absence | Δ | ◯ | Δ | ◯ |
| Example 2-10 | Workpiece A | 45 | 65 | 10 | 1/5 | 45 | Absence | ◯ | ◯ | ◯ | ◯ |
| Example 2-11 | Workpiece A | 45 | 65 | 30 | 1/5 | 45 | Absence | ◯ | ◯ | ◯ | ◯ |
| Example 2-12 | Workpiece A | 45 | 65 | 50 | 1/5 | 45 | Absence | ◯ | Δ | ◯ | ◯ |
| Example 2-13 | Workpiece A | 45 | 65 | 100 | 1/5 | 45 | Absence | ◯ | Δ | ◯ | ◯ |
| Example 2-14 | Workpiece A | 20 | 50 | 15 | 1/8 | 45 | Absence | Δ | ◯ | ◯ | ◯ |
| Example 2-15 | Workpiece A | 20 | 50 | 15 | 1/6 | 45 | Absence | ◯ | ◯ | ◯ | ◯ |
| Example 2-16 | Workpiece A | 20 | 50 | 15 | 1/4 | 45 | Absence | Δ | ◯ | ◯ | ◯ |
| Example 2-17 | Workpiece A | 20 | 50 | 15 | 1/5 | 10 | Absence | Δ | ◯ | ◯ | ◯ |
| Example 2-18 | Workpiece A | 20 | 50 | 15 | 1/5 | 40 | Absence | ◯ | ◯ | ◯ | ◯ |
| Example 2-19 | Workpiece A | 20 | 50 | 15 | 1/5 | 50 | Absence | ◯ | ◯ | ◯ | ◯ |
| Example 2-20 | Workpiece A | 20 | 50 | 15 | 1/5 | 60 | Absence | Δ | ◯ | ◯ | ◯ |
| Example 2-21 | Workpiece A | 45 | 65 | 15 | 1/5 | 45 | Presence | ◯ | ◯ | ◯ | ◯ |
| Example 2-22 | Workpiece B | 45 | 65 | 15 | 1/5 | 45 | Presence | ◯ | ◯ | ◯ | ◯ |
| Example 2-23 | Workpiece C | 45 | 65 | 15 | 1/5 | 45 | Presence | ◯ | ◯ | ◯ | ◯ |
| Example 2-24 | Workpiece D | 45 | 65 | 15 | 1/5 | 45 | Presence | ◯ | ◯ | ◯ | ◯ |
| Example 2-25 | Workpiece E | 45 | 65 | 15 | 1/5 | 45 | Presence | ◯ | ◯ | ◯ | ◯ |
| Example 2-26 | Workpiece F | 45 | 65 | 15 | 1/5 | 45 | Presence | ◯ | ◯ | ◯ | ◯ |

The evaluation of polished workpieces and the evaluation of environment after polishing were summarized in Table 2. In Examples 2-1 to 2-21, the workpieces A were polished. As a result, evaluation was "Δ" or "◯" even in every condition. The quality of the workpiece, which is evaluated as "Δ" is about quality where the workpiece as a product does not substantially have a problem. Further, the evaluation "Δ" is a level that is substantially changed into the evaluation "◯" by the optimization of the other conditions. It is possible to confirm that every example has a difference in results of processing accuracy, the surface state, and the remaining of abrasive. However, there is a difference in results, but the quality of the workpiece does not cause problems about any of the conditions of Examples 2-1 to 2-21. Accordingly, it was possible to confirm that the workpiece A could be polished well in all Examples of Table 2.

Moreover, in Examples 2-22 and 2-23, the dimensions of the workpieces were changed and the workpieces were evaluated under the same evaluation conditions as the Example 2-21. As a result of the evaluation, it was possible to confirm that the workpiece could be polished well regardless of the dimensions of the workpiece. Further, in Examples 2-24 to 2-26, the materials of the workpieces were changed and the workpieces were evaluated under the same evaluation conditions as the Example 2-21. As a result of the evaluation, it was possible to confirm that the workpiece could be polished well in any case of ferrite, glass, and metal (copper).

Furthermore, in Examples 2-1 to 2-26, the scattering of the abrasive was evaluated together with the workpiece. Since the remarkable scattering of the abrasive could not be confirmed, it was possible to confirm that the abrasive fed from the abrasive-feeding unit 30 was recovered by the dust collector 42 without being scattered to the outside of the processing vessel 10 after the polishing of the workpieces present in the processing vessel 10 in any example.

Second Embodiment

Next, a polishing device, which includes a vibrating unit as a fluidizing unit, as an example of a polishing device of another embodiment, will be described as a second embodiment. Meanwhile, only differences between the first and second embodiments will be described in the following description.

As illustrated in FIG. 7A, a polishing device 101 of this embodiment includes a processing vessel 110, a vibrating unit 120 that is a fluidizing unit, an abrasive-feeding unit 130, and a suction unit 140.

A vessel, which has the same structure as the processing vessel 10 described in the first embodiment, is used as the processing vessel 110.

The vibrating unit 120 includes a holder 121 that holds the processing vessel 110, a vibration force-generating unit 122, and a pedestal 123. The holder 121 has the shape of a cylinder of which a bottom surface is closed and which includes a flange portion formed at a bottom portion thereof. The bottom portion is provided with an opening into which the following suction member 141 can be inserted.

The vibration force-generating unit 122 includes a rotating shaft 122a that is rotatably held at the center of a bottom portion of the holder 121, first and second weights 122b and 122c that are held on the rotating shaft 122a, a motor 122d that is fixed to the pedestal 123, a rotation transmission member 122e that transmits the rotation of the motor 122d to the rotating shaft 122a, and connecting members 122f that connect the holder 121 to the pedestal 123 so as to allow the holder 121 to vibrate.

The first and second weights 122b and 122c are rectangular or fan-shaped members. An opening to which the rotating shaft 122a can be fitted is formed at one end portion of each of the first and second weights 122b and 122c, and the first and second weights 122b and 122c are fixed by bolts or the like while the rotating shaft 122a is inserted into the openings. Since the rotating shaft 122a is made eccentric by the first and second weights 122b and 122c, vibration is applied to the holder 121, that is, the processing vessel 110 during the rotation of the rotating shaft 122a. In this case, it is possible to adjust the fluidization state of the workpieces W by adjusting a phase difference β of the second weight 122c with reference to the first weight 122b illustrated in FIG. 7B. When the workpieces W are fluidized by the vibrating unit 120, a flow in which flows Y directed toward the circumference, a flow X moving along the circumference, and flows Z moving in a vertical direction are combined is generated. When the phase difference β is excessively small, the flows Y directed toward the circumference linearly extend toward the circumference. When the phase difference β is excessively large, the flows Y directed toward the circumference are changed into flows directed toward the center of the bottom portion. For example, it is possible to set the phase difference β in the range of 30° to 75°, more preferably, in the range of 45° to 60° in order to more uniformly agitate the workpieces.

The rotation transmission member 122e includes pulleys that are fixed to the rotating shaft 122a and a rotating shaft of the motor 122d, and a belt that is stretched between the pulleys. The rotation of the motor 122d can be transmitted to the rotating shaft 122a by this structure.

The holder 121 to which the vibration force-generating unit 122 is connected to an upper portion of the pedestal 123 with the connecting members 122f interposed therebetween. The connecting members 122f have only to connect the holder 121 so as to allow the holder 121 to vibrate. For example, springs, rubber, or the like can be used as the connecting members. In this embodiment, springs are used as the connecting members. A plurality of (in this embodiment, eight) protrusions, each of which can fix one end of the spring, are provided on each of portions of the flange portion of the holder 121 and the pedestal 123, which face each other, at regular intervals, and the holder 121 is connected to the pedestal 123 by the springs so as to be capable of vibrating.

Meanwhile, in order to facilitate a flow directed toward the flows Z moving in the vertical direction in FIG. 8, an agitation facilitating member (not illustrated) may be provided between a bottom surface portion 112 of the processing vessel 110 and the holder 121. For example, when a plurality of spherical bodies made of rubber are provided as the agitation facilitating member, the agitation facilitating member strikes the back of the bottom surface portion 112 of the processing vessel 110 during the vibration of the holder 121. Accordingly, a flow directed toward the flows Z moving in the vertical direction is facilitated.

A unit, which has the same structure as the abrasive-feeding unit 30 described in the first embodiment, is used as the abrasive-feeding unit 130.

The suction unit 140 includes a suction member 141 that is disposed so that a gap is formed between one end face of the suction member 141 and the bottom surface portion 112 of the processing vessel 110, a dust collector 142 that generates a suction force, and a hose 143 that connects the suction member 141 to the dust collector 142. The suction member 141 includes a cylindrical straightening portion 141a of which both ends are opened and which continuously has the same cross-section, and a conical suction portion 141b which is connected to one end face of the straightening portion 141a and of which a cross-sectional area is reduced as it goes away from the straightening portion 141a. The hose 143 is connected to a reduced-diameter end of the suction portion 141b, and the other end of the hose 143 is connected to the dust collector 142 that can recover the abrasive by suction. Accordingly, the suction member 141 and the dust collector 142 are connected to each other.

The straightening portion 141a of the suction member 141 serves to straighten an air flow so that the air flow generated during suction flows toward the dust collector 142 without flowing back to the open end of the straightening portion 141a. Further, the suction portion 141b serves to accelerate the air flow so that the air flow having passed through the straightening portion 141a efficiently flows toward the dust collector 142. Meanwhile, if the abrasive can be sucked by only the suction portion 141b without being scattered to the outside of the suction member 141, the straightening portion 141a may not be provided.

The size of an open end of the suction member 141 (an end of the suction member 141 opposite to the reduced-diameter end) may be slightly larger than the size of the bottom surface portion 112 of the processing vessel 110 so that the abrasive can be sucked from the entire bottom surface portion 112. Alternatively, the size of the open end of the suction member 141 may be smaller than the size of the bottom surface portion 112 so that the abrasive can be sucked from a part of the bottom surface portion 112. Further, the open end of the suction member 141 may be disposed so that a gap is formed between the open end of the suction member 141 and the bottom surface portion 112 of the processing vessel 110. In this embodiment, the size of the open end is smaller than the size of the bottom surface portion 112 of the processing vessel so that the abrasive can be sucked from a part of the bottom surface portion 112, and the abrasive-feeding unit 130 is disposed so that the abrasive can be fed to a position facing the open end. Meanwhile, if the abrasive can be sucked by only the hose 143 without being scattered to the outside, the suction member 141 may not be provided.

When the dust collector 142 is operated, an abrasive suction portion B where the abrasive passes and is sucked is formed at a position on the bottom surface portion 112 facing the open end of the suction member 141. The size of the abrasive suction portion B can be set in the range of 10% to 40% of the area of the bottom surface portion 112 of the processing vessel 110. Since superfluous workpieces W are fixed to the bottom surface portion 12 when the area of the abrasive suction portion B is excessively large, the agitation of the workpieces W is insufficient. When the area of the abrasive suction portion B is excessively small, it is not possible to sufficiently perform the suction of the abrasive.

Since an air flow directed toward the dust collector 142 from the suction member 141 is generated when the dust collector 142 is operated, the abrasive having passed through the processing vessel 110 is sucked toward the suction member 141. In this case, since an air flow directed inward from the outside is generated near the open end of the suction member 141, the scattering of the abrasive, which has passed through the processing vessel 110, to the outside of the suction member 141 is prevented. However, since the outside air cannot be sufficiently sucked when the gap formed between the processing vessel 110 and the open end of the suction member 141 is excessively small, the air flow directed inward from the outside of the suction member 141 is not generated. Further, when the gap is excessively large, the air flow directed inward from the outside of the suction member 141 is not generated due to a pressure loss. Accordingly, there is a concern that the abrasive having passed through the processing vessel 110 may be scattered to the outside of the suction member 141 even when the gap is excessively large or excessively small. The gap, which is formed between the processing vessel 110 and the suction member 141 when the processing vessel 110 is closest to the suction member 141, can be set in the range of 1 mm to 25 mm and, and more specifically, can be set in the range of 5 mm to 15 mm.

The abrasive, which is recovered by the dust collector 142, contains fine particles, such as an abrasive of which the size is reduced due to the generation of cracks or chippings caused by the contact between the workpieces W and itself or polishing waste of the workpieces W, in addition to abrasive that can be used again. A classifying unit may be further provided to recover the abrasive, which can be used again, from the abrasive and the fine particles. The abrasive is classified into the abrasive, which can be used again, and fine particles by the classifying unit, and the abrasive, which can be used again, can be returned to the storage tank 131. The classifying unit may be provided on a path, which is directed toward the dust collector 142 from the suction member 141, and may be provided on a separate path. The classifying unit can include a known device, such as an air flow classifier or a sieve.

A fluidization control unit (not illustrated), which controls the fluidization state of the workpieces W present in the processing vessel 110, may be further used. Examples of the fluidization control unit include a unit that arbitrarily changes the rotational speed of the motor 122d. It is possible to change the fluidization state of the workpieces W by changing the angle or the speed according to the progression of polishing. Accordingly, the workpieces W can be fluidized under conditions corresponding to properties and the like of all the workpieces W. In addition, when chippings or cracks of the workpieces W are easily generated, it is possible to prevent the chippings or cracks of the workpieces W at the time of the start of fluidization.

Third Embodiment

Next, a polishing device and a polishing method according to a third embodiment will be described. The polishing device and the polishing method according to this embodiment continuously polish workpieces. Meanwhile, only difference between the polishing device and the polishing method according to the first embodiment and the polishing device and the polishing method according to the third embodiment will be mainly described in the following description.

Figure 9:
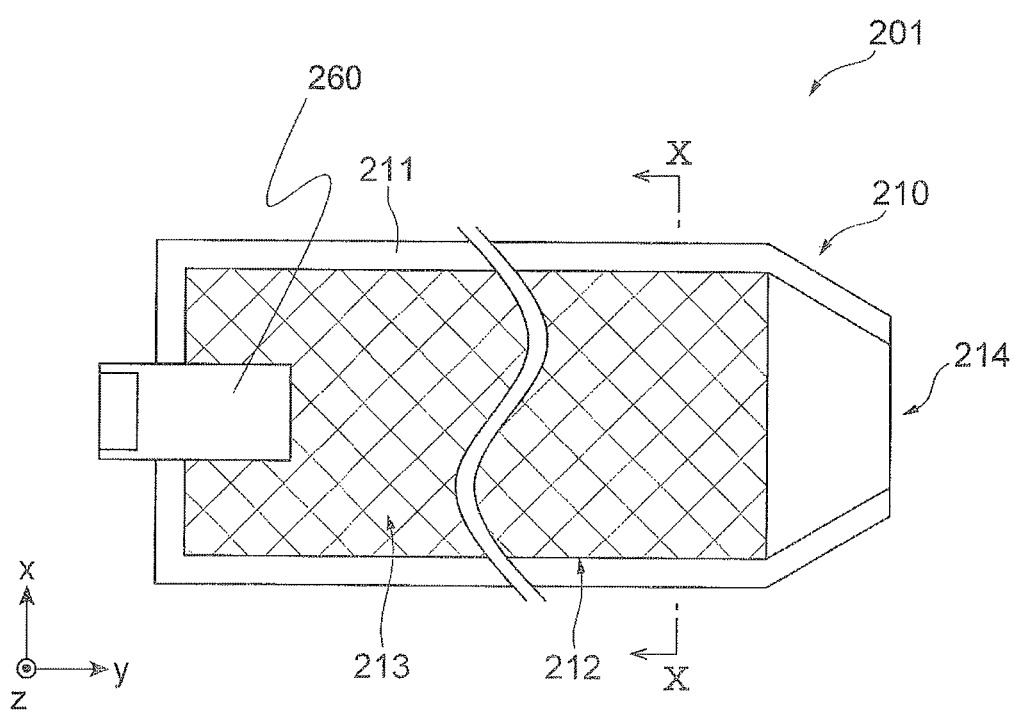
FIG. 9 is a plan view schematically illustrating the structure of a polishing device of a third embodiment.
Figure 10:
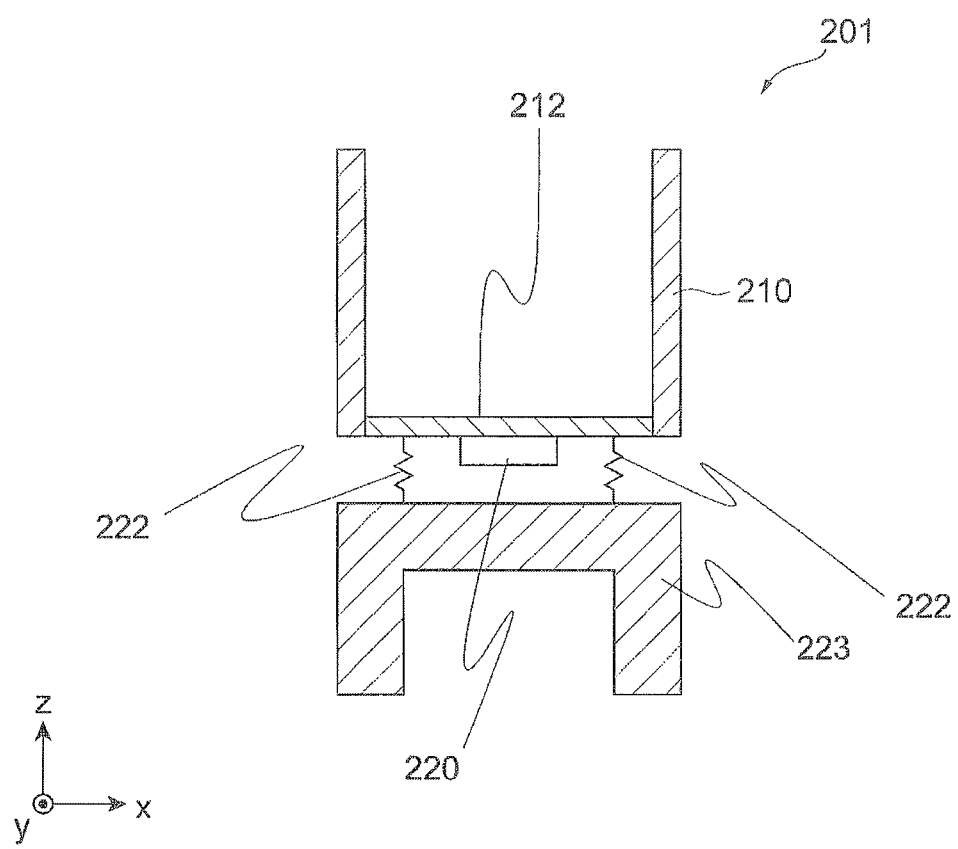
FIG. 10 is a cross-sectional view taken along line X-X of FIG. 9.
Figure 11:
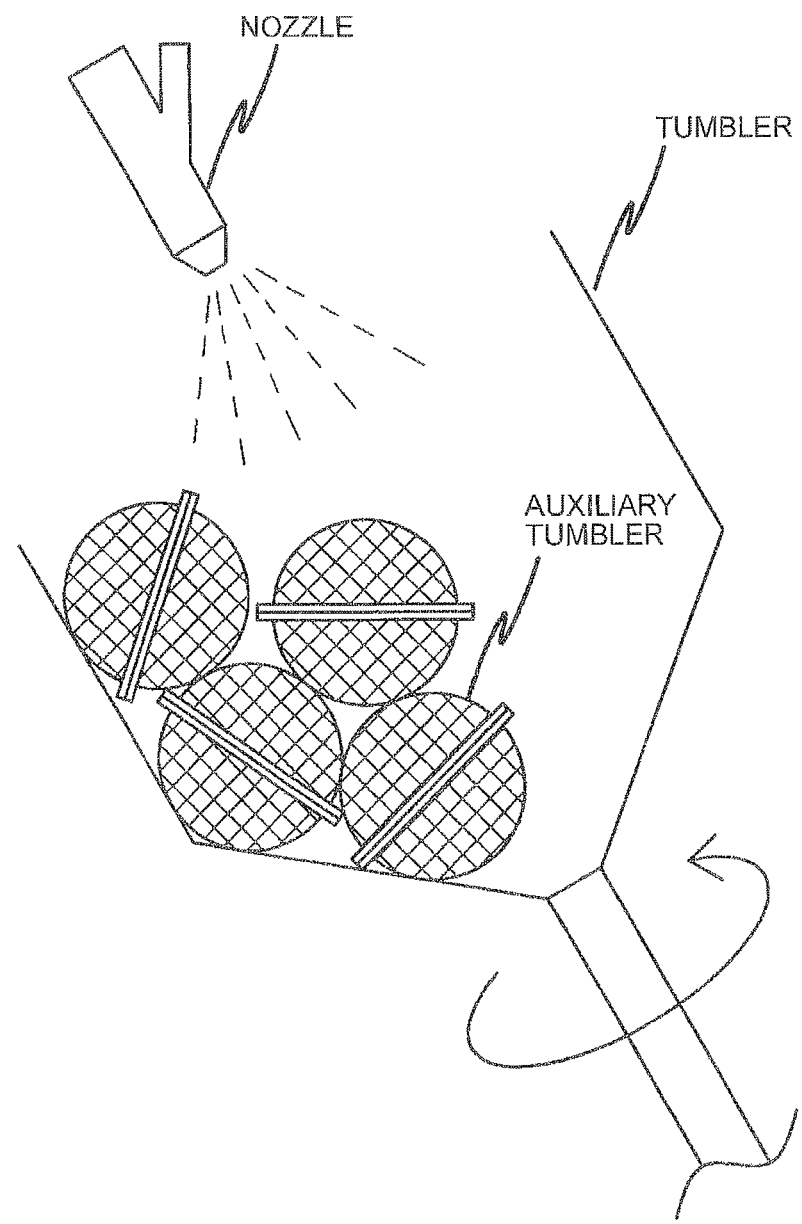
FIG. 11 is a schematic diagram illustrating a polishing device in the related art.

A polishing device 201 according to the third embodiment is illustrated in FIGS. 9 and 10. FIG. 9 is a plan view of the polishing device 201, and FIG. 10 is a cross-sectional view taken along line X-X of FIG. 9. Meanwhile, in the following description, a width direction of a processing vessel 210 is described as an x direction, a longitudinal direction of the processing vessel 210 is described as a y direction, and a direction orthogonal to the x direction and the y direction is described as a z direction. The polishing device 201 includes the processing vessel 210, a vibrating-advancing unit 220, connecting members 222, and a pedestal 223.

As illustrated in FIG. 9, the processing vessel 210 has substantially the shape of a box having substantially a rectangular planar shape that is longer in the y direction than in the x direction. The processing vessel 210 includes a bottom surface portion 212 and a wall portion 211. In an example illustrated in FIG. 9, the bottom surface portion 212 includes wires disposed in a mesh shape and regions surrounded by the wires form openings 213. The width of the opening 213 is larger than the particle size of an abrasive and is smaller than the width of a workpiece W. Accordingly, the bottom surface portion 212 allows the abrasive to pass therethrough and allows the workpieces to stay thereon. The wall portion 211 stands along an edge portion of the bottom surface portion 212 and defines a space, which is present on the bottom surface portion 212, from the side. A discharge portion 214, which does not include the wall portion 211, is formed at one end portion (a right edge portion in FIG. 9) of the processing vessel 210 in the y direction. The discharge portion 214 is used to discharge the workpieces W, which are present in the processing vessel 210, to the outside.

As illustrated in FIG. 10, the processing vessel 210 is supported by the pedestal 223 with the connecting members 222 interposed therebetween so as to be capable of vibrating. The connecting members 222 may be formed of, for example, springs, rubber, or the like.

The vibrating-advancing unit 220 is provided on the back, that is, the lower surface of the bottom surface portion 212. The vibrating-advancing unit 220 fluidizes the workpieces W, which are present in the processing vessel 210, and advances the workpieces W, which are charged into the processing vessel 210, toward the discharge portion 214 by applying vibration to the processing vessel 210. For example, an eccentric motor can be used as the vibrating-advancing unit 220.

A workpiece-charging unit 260 is provided above the other end portion (a left side in FIG. 9) of the processing vessel 210 in the y direction. The workpiece-charging unit 260 continuously or intermittently charges workpieces W into the processing vessel 210. Here, "continuously charging workpieces W" means that a predetermined amount of workpieces W continues to be charged into the processing vessel 210. Meanwhile, "intermittently charging workpieces W" means that a predetermined amount of workpieces W is charged into the processing vessel 210 at intervals. For example, a known mechanism, such as a vibrating feeder, a belt conveyor, or a bucket conveyor, can be used as the workpiece-charging unit 260.

The polishing device 201 further includes an abrasive-feeding unit and a suction unit. For the convenience of description, the abrasive-feeding unit and the suction unit are not illustrated in FIGS. 9 and 10. Units, which have the same structures as the abrasive-feeding unit 30 and the suction unit 40 illustrated in FIG. 1, can be used as the abrasive-feeding unit and the suction unit. A suction member of the suction unit is disposed on the back side, that is, the lower side of the bottom surface portion 212. Further, the abrasive-feeding unit is disposed on the surface side, that is, the upper side of the bottom surface portion 212.

Next, the polishing method according to the third embodiment will be described. In this polishing method, the vibrating-advancing unit 220, the suction unit, and the abrasive-feeding unit are operated first. Next, workpieces W are continuously or intermittently charged into the processing vessel 210 by the workpiece-charging unit 260 (workpiece-charging step). The workpieces W, which are charged into the processing vessel 210, are fluidized in the processing vessel 210 by the vibration of the processing vessel 210. In addition, the workpiece W present in the processing vessel 210 are moved, that is, advanced toward the discharge portion 214 from the other end portion of the processing vessel 210 in the y direction (fluidizing-advancing step).

Further, in the polishing method of this embodiment, the abrasive is fed to the workpieces W, which are present in the processing vessel 210, from the abrasive-feeding unit (abrasive-feeding step). Furthermore, an air flow directed to pass through the processing vessel 210, that is, an air flow directed toward the back side from the surface side of the bottom surface portion 212 is generated by the suction unit (air flow generating step). Accordingly, an abrasive suction portion B similar to the abrasive suction portion illustrated in FIG. 6 is formed on the surface of the bottom surface portion 212. While the workpieces W present in the processing vessel 210 are advanced toward the discharge portion 214, the workpieces W pass above the abrasive suction portion B. In this case, the abrasive fed from the abrasive-feeding unit passes between the workpieces W while riding the air flow, and is rubbed with the workpieces W. As a result, the workpieces W are polished (polishing step). It is possible to adjust the degree of polishing of the workpieces W by adjusting the magnitude of the vibration that is applied by the vibrating-advancing unit 220 and changing the speed of the workpieces W that pass through the abrasive suction portion B. The polished workpieces W having passed through the abrasive suction portion B continue to be further advanced, are discharged to the outside of the processing vessel 210 from the discharge portion 214, and are recovered (workpiece recovering step). Meanwhile, the abrasive having passed through the bottom surface portion 212 is recovered by the suction unit (abrasive recovering step). According to the polishing method of the third embodiment, it is possible to continuously polish the workpieces W.

INDUSTRIAL APPLICABILITY

Examples in which the corners of the rectangular parallelepiped workpieces are rounded have been described in the embodiments, but the types of the workpieces and the processing purposes of the workpieces are not limited thereto. Not only hard and brittle materials, which have a hard property and a brittle property, such as ceramics, silicon, ferrite, and crystalline materials, but also various composite materials, such as a resin, as workpieces can be polished well. Further, the processing purposes may be the adjustment of the surface roughness of the workpieces, deburring, the removal of a surface layer, and the like. For example, when the polishing method is applied to the removal of the surface layer of ceramics, the surface layer is removed. Accordingly, when a film, such as a coating, is formed in a post process, it is possible to improve the adhesion between the film and the ceramics.

A polishing device according to an aspect of the invention is particularly suitably used for the polishing of a small component. For example, when a workpiece is a component, such as a multilayer ceramic capacitor or an inductor, not only a component of which the length of one side is the range of about 800 μm to 1600 μm, but also a very small component of which the length of one side is the range of about 100 μm to 200 μm can be polished well.

Further, as long as workpieces can be fluidized in the processing vessel, not only small workpieces but also larger workpieces can be polished. For example, a workpiece of which the length of one side is the range of about 10 mm to 30 mm can be polished well.

REFERENCE SIGNS LIST 1, 101 polishing device, 10, 110, 210 processing vessel, 11 wall portion, 12, 112, 212 bottom surface portion, 13, 213 opening, 14 flange portion, 20 rotating unit, 21, 121 holder, 22 motor, 23 rotation transmission member, 30, 130 abrasive-feeding unit, 31, 131 storage tank, 32 conveyance unit, 32a trough, 32b abrasive supply port, 32c abrasive conveyance portion, 32d abrasive discharge portion, 32e abrasive discharge port, 32f conveyance screw, 32g conveyance shaft, 32h conveyance blade, 32i conveyance motor, 32j regulating plate, 33 abrasive-feeding member, 40, 140 suction unit, 41, 141 suction member, 41a, 141a straightening portion, 41b, 141b suction portion, 42, 142 dust collector, 43, 143 hose, 50 air flow control member, 120 vibrating unit, 122 vibration force-generating unit, 122a rotating shaft, 122b first weight, 122c second weight, 122d motor, 122e rotation transmission member, 122f, 222 connecting member, 123, 223 pedestal, 214 discharge portion, 220 vibrating-advancing unit, 260 workpiece-charging unit, B abrasive suction portion, L imaginary line, T axis of rotation, W workpiece

The invention claimed is:

1. A polishing device that polishes surfaces of a plurality of workpieces, the polishing device comprising:
a processing vessel that includes a bottom surface portion having a surface side and a back side and allowing an abrasive to pass therethrough, and allows the plurality of the workpieces to stay on the surface side of the bottom surface portion;
a fluidizing unit that fluidizes the plurality of the workpieces in the processing vessel;
an abrasive-feeding unit that feeds the abrasive to the surface side of the bottom surface portion; and
a suction unit that generates an air flow in a direction from the surface side to the back side of the bottom surface portion, and recovers the abrasive by suction, on the back side of the bottom surface portion.

2. The polishing device according to claim 1,
wherein the fluidizing unit is a vibrating unit that vibrates the processing vessel or a rotating unit that rotates the processing vessel about a center of the bottom surface portion as an axis.

3. The polishing device according to claim 2,
wherein the fluidizing unit further includes a fluidization control unit that changes a fluidization state.

4. The polishing device according to claim 2,
wherein the fluidizing unit is the rotating unit, and
the processing vessel is supported by the rotating unit so as to be inclined with respect to a horizontal plane.

5. The polishing device according to claim 4,
wherein an inclination angle of the processing vessel is in the range of 30° to 70° with respect to the horizontal plane.

6. The polishing device according to claim 1,
wherein the bottom surface portion of the processing vessel is provided with an opening.

7. The polishing device according to claim 6,
wherein the opening is formed in a mesh shape and a mesh size of the opening is in the range of 70 μm to 1100 μm.

8. The polishing device according to claim 1,
wherein when suction is performed by the suction unit, an abrasive suction portion where the abrasive passes through the processing vessel and is sucked by the suction unit is formed on a part of the bottom surface portion of the processing vessel.

9. The polishing device according to claim 8,
wherein an area of the abrasive suction portion is in the range of ⅛ to ¼ of an area of the bottom surface portion of the processing vessel.

10. The polishing device according to claim 8,
wherein a suction speed of the abrasive passing through the abrasive suction portion is 5 m/sec or more and lower than 100 m/sec.

11. The polishing device according to claim 10,
wherein a center of the abrasive suction portion is positioned so as to be distant from a direction, which is toward a lower end of a peripheral edge portion of the bottom surface portion from the center of the bottom surface portion of the processing vessel, by a predetermined angle in a rotation direction of the processing vessel.

12. The polishing device according to claim 2,
wherein an air flow control member, which controls an air flow allowing the abrasive to pass through the processing vessel, is disposed at the center of the bottom surface portion of the processing vessel.

13. The polishing device according to claim 1,
wherein the abrasive-feeding unit includes:
a storage tank that stores the abrasive;
an abrasive discharge port through which the abrasive is fed to the plurality of the workpieces;
and a conveyance unit that conveys the abrasive supplied from the storage tank toward the abrasive discharge port,
the conveyance unit includes:
a conveyance screw that includes spiral blades provided on a rotating shaft; and
a trough in which the conveyance screw is provided and which includes the abrasive discharge port formed at a lower portion of an end thereof and an abrasive supply port formed at an upper surface of a rear portion thereof so as to be connected to the storage tank,
an inner space of the trough is divided into a space that is formed by the conveyance screw and the trough and a space that is positioned in front of the conveyance screw and includes the abrasive discharge port, and
a regulating plate, in which a crushing portion through which the abrasive passes is formed, is disposed between an end of the conveyance screw and the abrasive discharge port.

14. The polishing device according to claim 1,
wherein the workpiece is made of a hard and brittle material.

15. The polishing device according to claim 14,
wherein the workpiece is a component of a multilayer ceramic capacitor or an inductor.

16. A polishing method using a polishing device including a processing vessel that includes a bottom surface portion having a surface side and a back side and allowing an abrasive to pass therethrough, and allows a plurality of workpieces to stay on the surface side of the bottom surface portion, a fluidizing unit that fluidizes the plurality of the workpieces, an abrasive-feeding unit that feeds the abrasive to the plurality of the workpieces present in the processing vessel, and a suction unit that recovers the abrasive by suction, the polishing method comprising:
a workpiece-charging step of charging the plurality of the workpieces into the processing vessel;
an air flow generating step of generating an air flow in a direction from the surface side to the back side of the bottom surface portion by the suction unit;
a fluidizing step of fluidizing the plurality of the workpieces, which are charged into the processing vessel, by the fluidizing unit;
an abrasive-feeding step of feeding the abrasive to the surface side of the bottom surface portion, from the abrasive-feeding unit;
a polishing step of polishing the plurality of the workpieces by allowing the abrasive to pass between the workpieces charged into the processing vessel by the air flow; and
an abrasive recovering step of recovering the abrasive by the suction unit, on the back side of the bottom surface portion.

17. A polishing method using a polishing device including a processing vessel that includes a bottom surface portion having a surface side and a back side and allowing an abrasive to pass therethrough and a discharge portion through which a plurality of workpieces are discharged to the outside, and allows the plurality of the workpieces to stay on the surface side of the bottom surface portion, a fluidizing unit that fluidizes the plurality of the workpieces, an abrasive-feeding unit that feeds the abrasive to the plurality of the workpieces present in the processing vessel, and a suction unit that recovers the abrasive by suction, the polishing method comprising:
a workpiece-charging step of continuously or intermittently charging the plurality of the workpieces into the processing vessel;
an air flow generating step of generating an air flow in a direction from the surface side to the back side of the bottom surface portion by the suction unit;
a fluidizing-advancing step of fluidizing the plurality of the workpieces, which are present in the processing vessel, by the fluidizing unit and advancing the plurality of the workpieces, which are charged in the workpiece-charging step, toward the discharge portion;
an abrasive-feeding step of feeding the abrasive to the surface side of the bottom surface portion from the abrasive-feeding unit;
a polishing step of polishing the plurality of the workpieces by allowing the abrasive to pass between the workpieces that are present in the processing vessel by the air flow;
an abrasive recovering step of recovering the abrasive by the suction unit, on the back side of the bottom surface portion; and
a workpiece recovering step of recovering the plurality of the workpieces that are discharged from the discharge portion.

18. The polishing method according to claim 16,
wherein a passage speed of the abrasive, which passes between the workpieces charged into the processing vessel, is 5 m/sec or more and lower than 100 m/sec.

19. The polishing method according to claim 16,
wherein the fluidizing unit is a rotating unit that rotates the processing vessel about a center of the bottom surface portion as an axis, and
in the fluidizing step, the processing vessel is rotated in the range of 5% to 50% of a critical rotational speed by the rotating unit.

20. The polishing method according to claim 17,
wherein a passage speed of the abrasive, which passes between the workpieces charged into the processing vessel, is 5 m/sec or more and lower than 100 m/sec.

* * * * *